United States Patent [19]
Yamada et al.

[11] Patent Number: 5,903,113
[45] Date of Patent: *May 11, 1999

[54] POWER OUTPUT APPARATUS AND METHOD OF CONTROLLING THE SAME

[75] Inventors: Eiji Yamada, Owariasahi; Takao Miyatani, Toyota; Yasutomo Kawabata; Ryouji Mizutani, both of Aichi-ken; Tetsuya Miura, Toyota, all of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/638,561

[22] Filed: Apr. 26, 1996

[30] Foreign Application Priority Data

May 19, 1995 [JP] Japan ................................. 7-145575
Aug. 29, 1995 [JP] Japan ................................. 7-245462

[51] Int. Cl.$^6$ .............................. H02K 5/00; B60K 1/00
[52] U.S. Cl. .......................... 318/10; 318/50; 318/287; 318/65; 310/92; 310/102 R; 180/65.3; 477/179
[58] Field of Search .................. 180/65.1, 65.3, 180/65.2, 270; 364/424.1, 426.026, 431, 426; 475/76, 107, 113, 104, 91; 477/20, 15, 179, 8, 30; 74/730.1, 845, 61, 655 A; 310/101, 102 R, 107, 92; 318/9, 300, 11, 287, 376, 290, 49, 78, 65, 79, 76, 87, 379, 381, 366

[56] References Cited

U.S. PATENT DOCUMENTS

| | | |
|---|---|---|
| 3,683,249 | 8/1972 | Shibata . |
| 3,789,281 | 1/1974 | Shibata . |
| 3,866,703 | 2/1975 | Eastham .................................. 180/65.1 |
| 4,309,620 | 1/1982 | Heidemeyer et al. .................. 180/65.2 |
| 4,335,429 | 6/1982 | Kawakatsu ............................. 180/65.2 |
| 4,533,011 | 1/1982 | Bock ....................................... 180/65.2 |
| 5,085,101 | 2/1992 | Oldfield ................................. 74/730.1 |
| 5,498,216 | 3/1996 | Bitsche et al. ............................. 477/20 |
| 5,501,641 | 3/1996 | Kollermeyer et al. .................. 475/107 |
| 5,635,805 | 6/1997 | Ibaraki et al. ........................... 318/139 |
| 5,637,987 | 6/1997 | Fattic et al. ............................ 180/65.3 |
| 5,644,200 | 7/1997 | Yang ....................................... 318/139 |
| 5,720,690 | 2/1998 | Hara et al. .............................. 180/65.2 |

FOREIGN PATENT DOCUMENTS

| | | |
|---|---|---|
| 0 725 474 | 8/1996 | European Pat. Off. . |
| 28 23 225 A1 | 11/1979 | Germany . |
| 30 25 756 A1 | 1/1982 | Germany . |
| 49-43311 | 4/1974 | Japan . |
| 53-133814 | 11/1978 | Japan . |
| 55-103100 | 8/1980 | Japan . |
| 1193965 | 6/1970 | United Kingdom . |
| 2278242 | 11/1994 | United Kingdom . |
| WO 89/04081 | 5/1989 | WIPO . |

Primary Examiner—John W. Cabeca
Attorney, Agent, or Firm—Oliff & Berridge, PLC

[57] ABSTRACT

A power output apparatus (20) of the present invention includes a clutch motor (30), an assist motor (40), and a controller (80) for controlling the clutch motor (30) and the assist motor (40). The clutch motor (30) includes an outer rotor (32) linked with a crankshaft (56) of a gasoline engine (50) and an inner rotor (34) connecting with a drive shaft (22). The assist motor (40) includes a rotor (42) connecting with the drive shaft (22). A control CPU (90) of the controller (80) controls a first driving circuit (91) to enable the clutch motor (30) to carry out the regenerative operation. The clutch motor (30) accordingly regenerates energy corresponding to a slip between the outer rotor (32) and the inner rotor (34) as electric power. The control CPU (90) then controls a second driving circuit (92) to enable the assist motor (40) to carry out the power operation with the electric power regenerated by the clutch motor (30), thereby rotating the drive shaft (22) in the reverse of the rotation of the crankshaft (56). The power output apparatus (20) of the invention thus constructed can transmit or utilize the power generated by the gasoline engine (50) at a high efficiency and enable the drive shaft (22) to rotate in the reverse of the rotation of the crankshaft (56).

20 Claims, 23 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically, the invention pertains to a power output apparatus for transmitting or utilizing power generated by an engine at a high efficiency and rotating a drive shaft in the reverse of the rotation of the output shaft of the engine. The invention also pertains to a method of controlling such a power output apparatus.

2. Description of the Prior Art

Torque converters utilizing a fluid are generally used to convert an output torque of an engine or the like to power and transmit the converted power. In the conventional fluid-based torque converters, an input shaft and an output shaft are not fully locked with each other and there is accordingly an energy loss corresponding to a slip occurring between the input shaft and the output shaft. The energy loss, which is consumed as a heat, is expressed as the product of the revolving speed difference between the input shaft and the output shaft and the torque transmitted at that time. In vehicles with such a torque converter mounted thereon, a large energy loss occurs in transient state like a starting time. The efficiency of power transmission is not 100% even in stationary driving. Compared with manual transmissions, the torque converters lead to a lower fuel consumption.

Some proposed power output apparatus do not use a fluid for torque conversion or power transmission unlike the conventional torque converters, but transmit power through mechanical-electrical-mechanical conversion. For example, a power output apparatus disclosed in JAPANESE PATENT LAYING-OPEN GAZETTE No. 53-133814 couples an output shaft of an engine with a rotating shaft of a d.c. motor via an electromagnetic coupling to make the rotating shaft work as a drive shaft. The engine drives one rotor on the side of d.c. field winding of the electromagnetic coupling, while the other rotor on the side of a.c. armature winding drives the rotating shaft of the d.c. motor or the drive shaft. Electric power produced by a slip between the two rotors of the electromagnetic coupling is supplied from the rotor on the side of a.c. armature winding to the d.c. motor via a rectifier. The d.c. motor also receives electric power from a battery to rotate the drive shaft. Unlike the conventional fluid-based torque converters, this proposed structure substantially has no energy loss due to the slip. It is accordingly possible to make the energy loss in the power transmission means relatively small by enhancing the efficiencies of the electromagnetic coupling and the d.c. motor.

In the proposed structure, however, the drive shaft (rotating shaft of the d.c. motor) is generally rotated only in the direction of rotation of the output shaft of the engine. No special account is taken into the requirement that the drive shaft is rotated in the reverse of the rotation of the output shaft of the engine.

SUMMARY OF THE INVENTION

The object of the present invention is to transmit or utilize power generated by an engine at a high efficiency and enable a drive shaft to rotate in the reverse of the rotation of the output shaft of the engine.

At least part of the above object is realized by a first power output apparatus for outputting power to a drive shaft.

The first power output apparatus comprises: an engine having an output shaft, the engine rotating the output shaft in a first direction; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with the drive shaft, the stator being electromagnetically coupled with the third rotor; second motor-driving means for exchanging electric currents with the second motor to vary the electromagnetic coupling of the stator with the third rotor; and control means for controlling the second motor-driving means to drive the second motor to make the drive shaft rotate in a second direction, which is opposite to the first direction.

The structure of the first power output apparatus does not require any specific gear to rotate the drive shaft in the reverse of the rotation of the output shaft of the engine, thereby reducing the total weight of the power output apparatus, saving the time and labor for the assembly, and decreasing the manufacturing cost.

In accordance with one aspect of the present invention, the power output apparatus further comprises: storage means for storing electric power; and wherein the control means comprises means for controlling the first motor-driving means to make a torque produced by the first motor at most a predetermined level, and controlling the second motor-driving means to supply the electric power stored in the storage means to the second motor.

In this structure, the control means controls the second motor-driving means to drive the second motor and thereby rotate the drive shaft in the second direction, that is, in the reverse of the rotation of the output shaft of the engine. The electric power stored in the storage means is used to drive the second motor. The control means also controls the first motor-driving means to make the torque produced by the first motor equal to or less than a predetermined level. The resulting torque output to the drive shaft is accordingly not much decreased by the torque produced by the first motor.

In accordance with another aspect of the present invention, wherein the control means comprises means for controlling the first motor-driving means to enable the first motor to regenerate electric power, and controlling the second motor-driving means to supply the regenerated electric power to the second motor.

In this structure, the first motor receives the power output from the engine to regenerate it as electric power, the second motor is driven with the regenerated electric power so as to rotate the drive shaft in the reverse of the rotation of the output shaft of the engine.

This structure can efficiently transmit power generated by the engine through the energy conversion, thereby realizing the reverse rotation of the drive shaft.

In accordance with still another aspect of the present invention, the power output apparatus further comprises: storage means for storing electric power; and wherein the control means comprises means for controlling the first motor-driving means to enable the first motor to regenerate electric power, and controlling the second motor-driving means to supply the regenerated electric power and the electric power stored in the storage means to the second motor.

In this structure, the second motor is driven with not only the electric power regenerated by the first motor but the electric power stored in the storage means, in order to rotate the drive shaft in the reverse of the rotation of the output shaft of the engine. The structure rotates the drive shaft in the reverse direction with the electric power regenerated by the first motor and the electric power stored in the storage means, thereby allowing a large torque to be output to the drive shaft.

In accordance with another aspect of the present invention, the power output apparatus further comprises: storage means for storing electric power; and wherein the control means comprises means for controlling the first motor-driving means to enable the first motor to regenerate electric power, and controlling the second motor-driving means to supply the regenerated electric power to the second motor and at least partly to the storage means to be stored.

This structure can charge the storage means with the residual electric power while realizing the reverse rotation of the drive shaft. This structure is especially favorable when the storage means has a little residual capacity of electric power.

In accordance with another aspect of the present invention, a second power output apparatus for outputting power to a drive shaft comprises: an engine having an output shaft, the engine rotating the output shaft in a first direction; a motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; motor-driving means for exchanging electric currents with the first motor to vary the electromagnetic coupling of the first rotor with the second rotor; storage means for storing electric power; and control means for controlling the motor-driving means to supply the electric power stored in the storage means to the motor to drive the motor and further to enable the motor to produce a torque acting in a second direction, which is opposite to the first direction, and apply the torque to the drive shaft, thereby rotating the drive shaft in the second direction.

In the second power output apparatus of the present invention, the control means controls the motor-driving means to drive the motor with the electric power stored in the storage means and further to enable the motor to apply the torque, which acts in the reverse of the rotation of the output shaft of the engine, to the drive shaft. On the output shaft of the engine, the torque produced by the motor substantially balances the friction torque of the output shaft of the engine (in the stationary state). The motor can accordingly rotate the drive shaft in the reverse of the rotation of the output shaft of the engine, with the friction torque of the engine as the support.

In accordance with still another aspect of the present invention, a third power output apparatus for outputting power to a drive shaft comprises: an engine having an output shaft, the engine rotating the output shaft in a first direction; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with the drive shaft, the stator being electromagnetically coupled with the third rotor; second motor-driving means for exchanging electric currents with the second motor to vary the electromagnetic coupling of the stator with the third rotor; and control means for, when the drive shaft rotates in a second direction, which is opposite to the first direction, controlling the second motor-driving means to enable the second motor to regenerate electric power, produce a first torque acting in the first direction, and apply the first torque to the drive shaft, the control means concurrently controlling the first motor-driving means to supply the regenerated electric power to the first motor to drive the first motor and further to enable the first motor to produce a second torque acting in the second direction and apply the second torque to the drive shaft.

In the third power output apparatus of the present invention, while the drive shaft rotates in the reverse of the rotation of the engine, the control means controls the second motor-driving means to enable the second motor to regenerate electric power. The control means also controls the first motor-driving means to drive the first motor with the electric power regenerated by the second motor. There is a certain amount of energy loss in the process of transmitting the regenerated power from the second motor to the first motor. The electric power consumed by the first motor is thus smaller than the electric power regenerated by the second motor. The revolving speed of the second motor is lower than the revolving speed of the first motor. The torque produced by the second motor accordingly has a greater magnitude than that of the torque produced by the first motor. On the drive shaft, the torque produced by the first motor acts in the reverse of the rotation of the engine, whereas the torque produced by the second motor acts in the direction of rotation of the engine. The resulting torque applied to the drive shaft accordingly acts in the direction of rotation of the engine. The drive shaft, which rotates in the reverse of the rotation of the engine, consequently receives a deceleration (that is, an acceleration in the direction of rotation of the engine) and gradually reduces its speed.

Even when the storage means is in fully charged state and can not absorb any more electric power, the structure of the third power output apparatus can reduce the speed of the reverse rotation of the drive shaft while enabling the first motor to consume the regenerated power.

In accordance with another aspect of the present invention, a fourth power output apparatus for outputting power to a drive shaft comprises: an engine having an output shaft, the engine rotating the output shaft in a first direction; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; first motor-driving means for exchanging electric currents with the first motor to vary the electromagnetic coupling of the first rotor with the second rotor; a second motor comprising a stator and a third rotor connected with the output shaft of the engine, the stator being electromagnetically coupled with the third rotor; second motor-driving means for exchanging electric currents with the second motor to vary the electromagnetic coupling of the stator with the third rotor; and control means for controlling the first motor-driving means to drive the first motor to make the drive shaft rotate in a second direction, which is opposite to the first direction.

The structure of the fourth power output apparatus does not require any specific gear to rotate the drive shaft in the reverse of the rotation of the output shaft of the engine, thereby reducing the total weight of the power output apparatus, saving the time and labor for the assembly, and decreasing the manufacturing cost.

In accordance with another aspect of the present invention, the power output apparatus further comprises: storage means for storing electric power; and wherein the control means comprises means for controlling the second motor-driving means to supply the electric power stored in the storage means to the second motor and enable the second motor to fix the output shaft of the engine and prevent the output shaft of the engine from rotating, and controlling the first motor-driving means to supply the electric power stored in the storage means to the first motor.

In this structure, the control means controls the first motor-driving means to drive the first motor and rotate the drive shaft in the reverse of the rotation of the output shaft of the engine. The electric power stored in the storage means is used to drive the first motor. The control means also controls the second motor-driving means to enable the second motor to fix the output shaft of the engine and interfere with rotation of the output shaft of the engine. Even when the first motor applies a torque to the output shaft of the engine, this structure effectively prevents the output shaft of the engine from rotating. The drive shaft can be sufficiently rotated in the reverse direction, with the output shaft of the engine as the support.

In accordance with another aspect of the present invention, wherein the control means comprises means for controlling the second motor-driving means to enable the second motor to regenerated electric power and controlling the first motor-driving means to supply the regenerated electric power to the first motor.

This structure can efficiently transmit the power generated by the engine through the energy conversion and realize the reverse rotation of the drive shaft.

In accordance with still another aspect of the present invention, the power output apparatus further comprises: storage means for storing electric power; and wherein the control means comprises means for controlling the second motor-driving means to enable the second motor to regenerate electric power and controlling the first motor-driving means to supply the regenerated electric power and the electric power stored in the storage means to the first motor.

In this structure, the drive shaft is rotated in the reverse of the rotation of the output shaft of the engine with the electric power regenerated by the second motor and the electric power stored in the storage means. This structure allows a large torque to be output to the drive shaft.

In accordance with another aspect of the present invention, the power output apparatus further comprises: storage means for storing electric power; and wherein the control means comprises means for controlling the second motor-driving means to enable the second motor to regenerate electric power and controlling the first motor-driving means to supply the regenerated electric power to the first motor and at least partly to the storage means to be stored.

This structure allows the drive shaft to rotate in the reverse of the rotation of the output shaft of the engine while charging the storage means with the remaining electric power. This structure is especially preferable when the storage means has a little residual capacity of electric power.

In accordance with still another aspect of the present invention, a fifth power output apparatus for outputting mechanical energy as power to a drive shaft comprises: an engine connected with a rotating shaft; a first motor connected with the rotating shaft; and a second motor connected with the drive shaft; wherein the engine produces mechanical energy and transmits the mechanical energy to the rotating shaft; the first motor receives the mechanical energy transmitted via the rotating shaft and mechanical energy transmitted from the second motor, converts the total mechanical energy to electrical energy, and supplies the converted electrical energy to the second motor; and the second motor converts the electrical energy supplied from the first motor to mechanical energy, transmits part of the converted mechanical energy to the first motor, and outputs the remainder of the converted mechanical energy to the drive shaft.

In the fifth power output apparatus of the present invention, the first motor converts the sum of the mechanical energy produced by the engine and the mechanical energy transmitted from the second motor to electrical energy, which is re-converted to mechanical energy by the second motor. Part of the converted mechanical energy is transmitted to the first motor, whereas the remainder is output to the drive shaft.

The structure of the fifth power output apparatus can efficiently transmit and utilize the mechanical energy generated by the engine. This structure is effective when a large amount of electrical energy is required.

In accordance with another aspect of the present invention, a sixth power output apparatus for outputting mechanical energy as power to a drive shaft comprises: an engine connected with a rotating shaft; a first motor connected with the rotating shaft; storage means for storing electrical energy; and a second motor connected with the drive shaft; wherein the engine produces mechanical energy and transmits the mechanical energy to the rotating shaft; the first motor receives the mechanical energy transmits via the rotating shaft and mechanical energy transmitted from the second motor, converts the total mechanical energy to electrical energy, and supplies the converted electrical energy to the second motor; the storage means supplies the stored electrical energy to the second motor; and the second motor receives the electrical energy supplied from the first motor and the electrical energy supplied from the storage means, converts the total electrical energy to mechanical energy, transmits part of the converted mechanical energy to the first motor, and outputs the remainder of the converted mechanical energy to the drive shaft.

The structure of the sixth power output apparatus is suitably applied to the cases that the electrical energy supplied from the first motor is insufficient.

In accordance with still another aspect of the present invention, a seventh power output apparatus for outputting mechanical energy as power to a drive shaft comprises: an engine connected with a rotating shaft; a first motor connected with the rotating shaft; a second motor connected with the drive shaft; and storage means for storing electrical energy; wherein the engine produces mechanical energy and transmits the mechanical energy to the rotating shaft; the first motor receives the mechanical energy transmitted via the rotating shaft and mechanical energy transmitted from the second motor, converts the total mechanical energy to electrical energy, and supplies the converted electrical energy to the second motor and the storage means; the second motor converts the electrical energy supplied from the first motor to mechanical energy, transmits part of the converted mechanical energy to the first motor, and outputs the remainder of the converted mechanical energy to the drive shaft; and the storage means stores the electrical energy supplied from the first motor.

In the seventh power output apparatus of the present invention, the electrical energy supplied from the first motor can be stored into the storage means and taken out according to the requirements.

The object of the present invention is also realized by a first method of controlling a power output apparatus for outputting power to a drive shaft, the method comprises the steps of: (a) providing an engine having an output shaft, the engine rotating the output shaft in a first direction; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; and a second motor comprising a stator and a third rotor connected with the drive shaft, the stator being electromagnetically coupled with the third rotor; and (b) driving the second motor to make the drive shaft rotate in a second direction, which is opposite to the first direction.

The invention is further directed to a second method of controlling a power output apparatus for outputting power to a drive shaft, the method comprises the steps of: (a) providing an engine having an output shaft, the engine rotating the output shaft in a first direction; a motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; and storage means for storing electric power; and (b) supplying the electric power stored in the storage means to the motor to drive the motor and further enabling the motor to produce a torque acting in a second direction, which is opposite to the first direction, and apply the torque to the drive shaft, thereby rotating the drive shaft in the second direction.

The present invention is also directed to a third method of controlling a power output apparatus for outputting power to a drive shaft, the method comprises the steps of: (a) providing an engine having an output shaft, the engine rotating the output shaft in a first direction; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; and a second motor comprising a stator and a third rotor connected with the drive shaft, the stator being electromagnetically coupled with the third rotor; (b) when the drive shaft rotates in a second direction, which is opposite to the first direction, enabling the second motor to regenerate electric power, produce a first torque acting in the first direction, and apply the first torque to the drive shaft; and (c) supplying the regenerated electric power to the first motor to drive the first motor and further enabling the first motor to produce a second torque acting in the second direction and apply the second torque to the drive shaft.

The present invention is also directed to a fourth method of controlling a power output apparatus for outputting power to a drive shaft, the method comprises the steps of: (a) providing an engine having an output shaft, the engine rotating the output shaft in a first direction; a first motor comprising a first rotor connected with the output shaft of the engine and a second rotor connected with the drive shaft, the second rotor being coaxial to and rotatable relative to the first rotor, the first and second rotors being electromagnetically coupled with each other, whereby power is transmitted between the output shaft of the engine and the drive shaft via the electromagnetic coupling of the first and second rotors; and a second motor comprising a stator and a third rotor connected with the output shaft of the engine, the stator being electromagnetically coupled with the third rotor; and (b) driving the first motor to make the drive shaft rotate in a second direction, which is opposite to the first direction.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
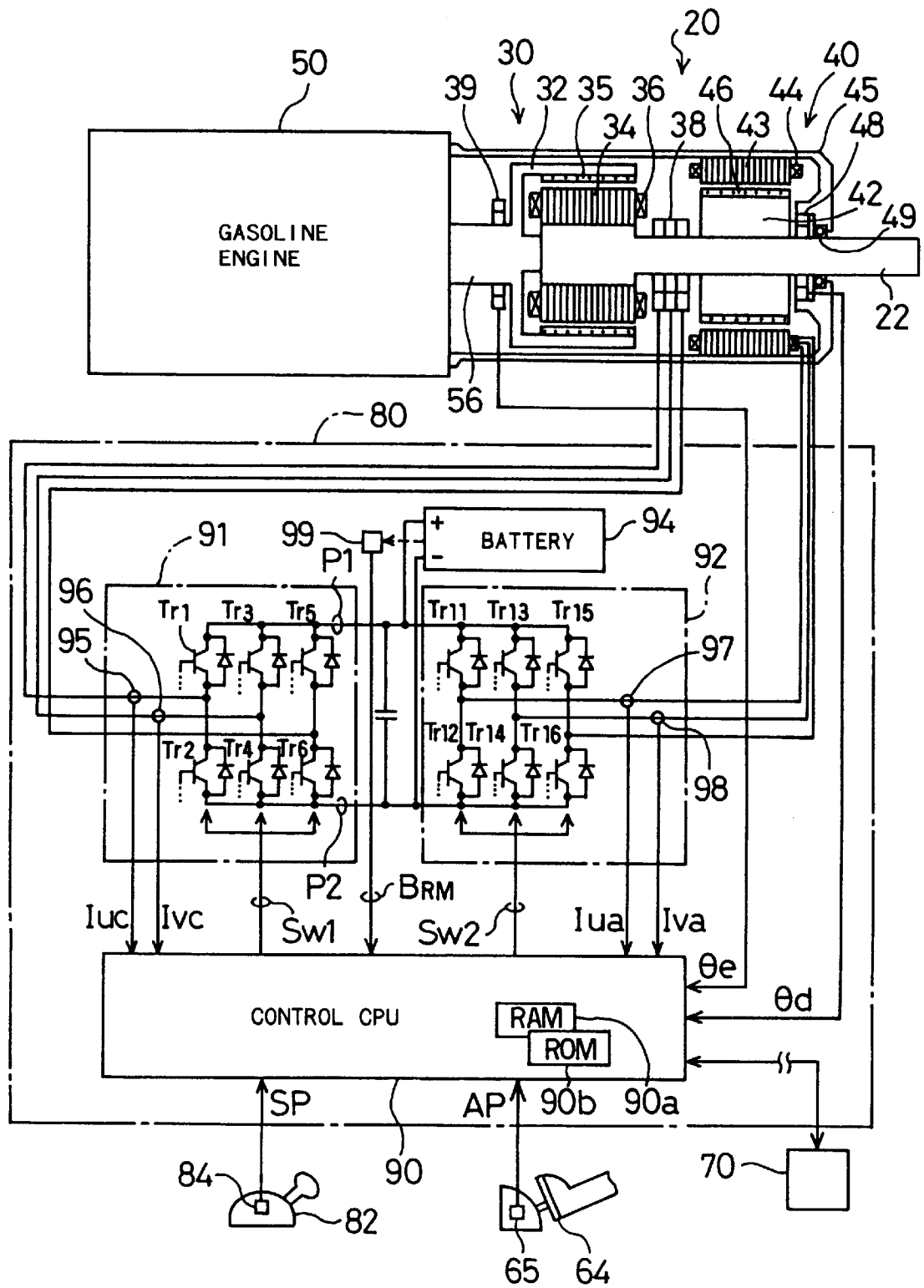
FIG. 1 schematically illustrates structure of a power output apparatus 20 as a first embodiment according to the present invention.
Figure 2:
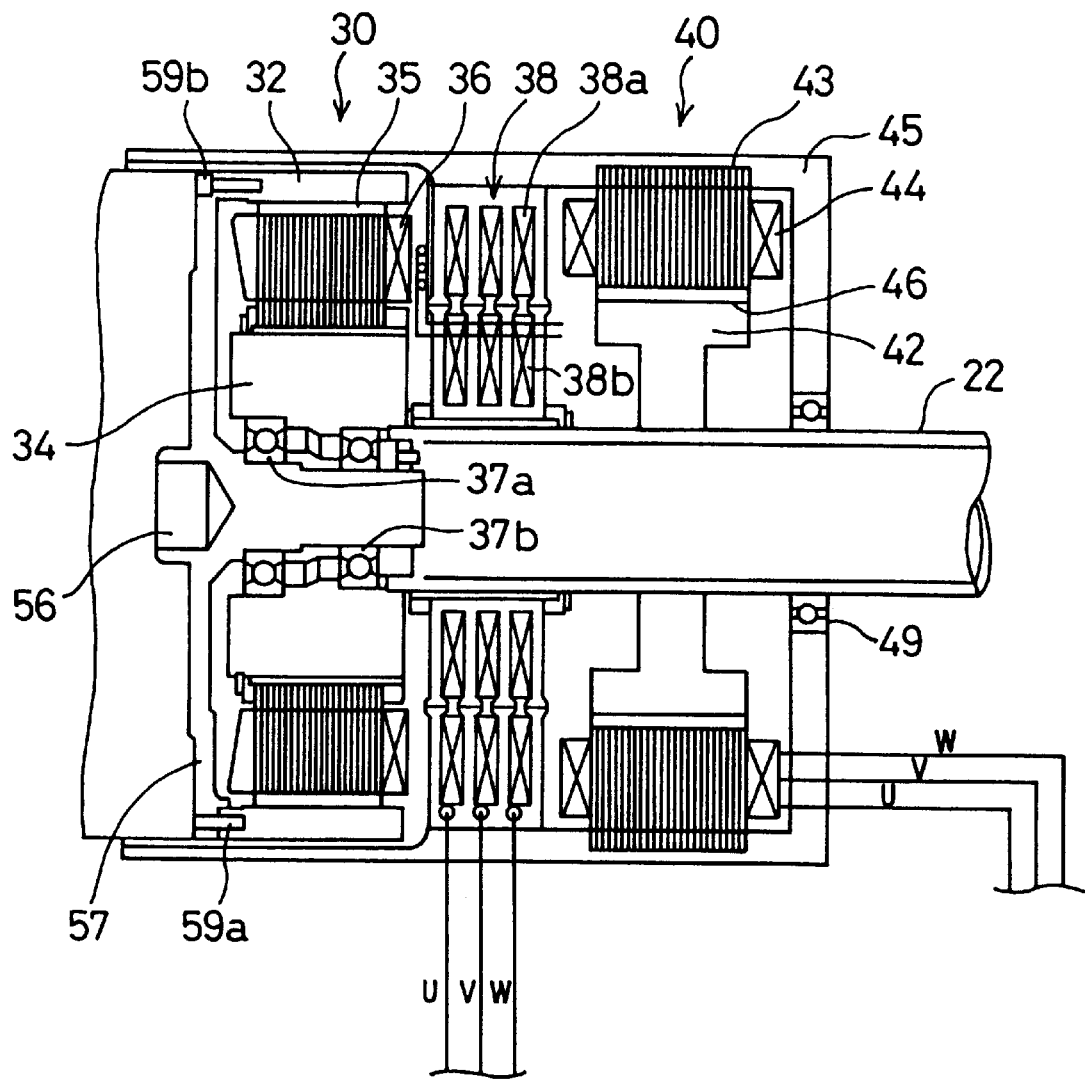
FIG. 2 is a cross sectional view illustrating detailed structures of a clutch motor 30 and an assist motor 40 included in the power output apparatus 20 of FIG. 1.
Figure 3:
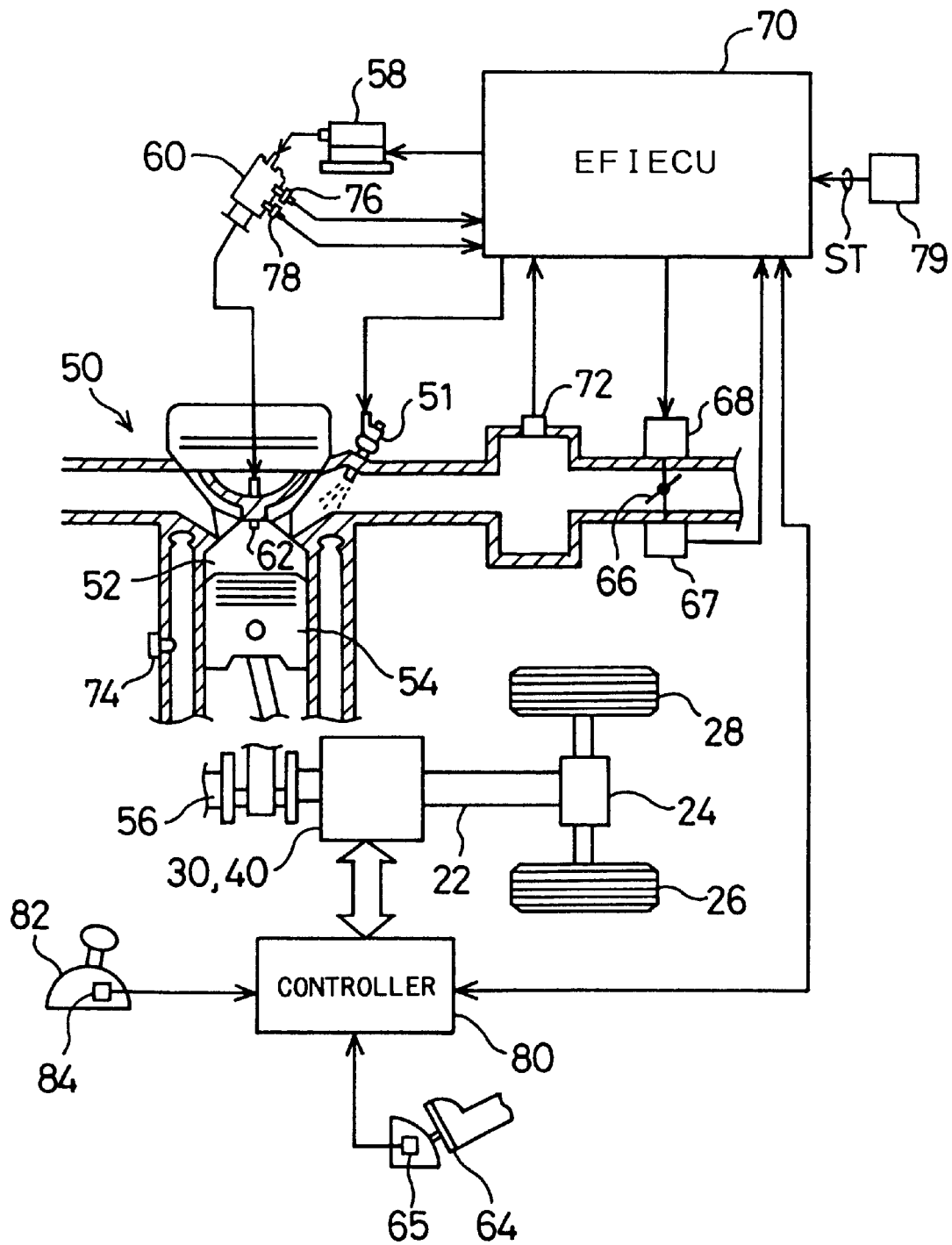
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first as a matter of convenience.

Referring to FIG. 3, the vehicle has a gasoline engine 50 driven by gasoline as a power source or a prime mover. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by a motor 68. An ignition plug 62 converts a high voltage applied from an igniter 58 via a distributor 60 to a spark, which explosively ignites and combusts the air/fuel mixture.

Operation of the gasoline engine 50 is controlled by an electronic control unit (hereinafter referred to as EFIECU) 70. The EFIECU 70 receives information from various sensors, which detect operating conditions of the gasoline engine 50. These sensors include a throttle position sensor 67 for detecting the valve travel or the position of the throttle valve 66, a manifold vacuum sensor 72 for measuring a load applied to the gasoline engine 50, a water temperature sensor 74 for measuring the temperature of cooling water in the gasoline engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the gasoline engine 50 is linked with a drive shaft 22 via a clutch motor 30 and an assist motor 40. The drive shaft 22 further connects with a differential gear 24, which eventually transmits the torque output from the drive shaft 22 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the gasoline engine 50 for generating power, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the gasoline engine 50, whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the gasoline engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38a fixed to the casing 45 and secondary windings 38b attached to the drive shaft 22 coupled with the inner rotor 34. Electromagnetic induction allows electric power to be transmitted from the primary windings 38a to the secondary windings 38b or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the gasoline engine 50 from the resolver 39, a rotational angle θd of the drive shaft 22 from the resolver 48, an accelerator pedal position AP (step-on amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal Sw2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The following describes the essential operation of the power output apparatus 20 thus constructed. Described first is a general operation carried out to drive the vehicle forward, that is, to rotate the drive shaft 22 in the direction of rotation of the crankshaft 56 of the gasoline engine 50. By way of example, it is assumed that the gasoline engine 50 driven by the EFIECU 70 rotates at a predetermined revolving speed Ne. While the transistors Tr1 through Tr6 in the first driving circuit 91 are in OFF position, the controller 80 does not supply any current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the gasoline engine 50. Under the condition that all the transistors Tr1 through Tr6 are in OFF position, there is no regeneration of energy from the three-phase coils 36, and the gasoline engine 50 is kept at an idle.

As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between a revolving speed Ne of the crankshaft 56 of the gasoline engine 50 and a revolving speed Nd of the drive shaft 22 (that is, difference Nc (=Ne−Nd) between the revolving speed of the outer rotor 32 and that of the inner rotor 34 in the clutch motor 30). A certain slip accordingly exists between the outer rotor 32 and the inner rotor 34 of the clutch motor 30. At this moment, the inner rotor 34 rotates at a revolving speed lower than that of the outer rotor 32. This implies that the revolving speed Nd of the drive shaft 22 is lower than the revolving speed Ne of the crankshaft 56 of the gasoline engine 50 (Nd<Ne). In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
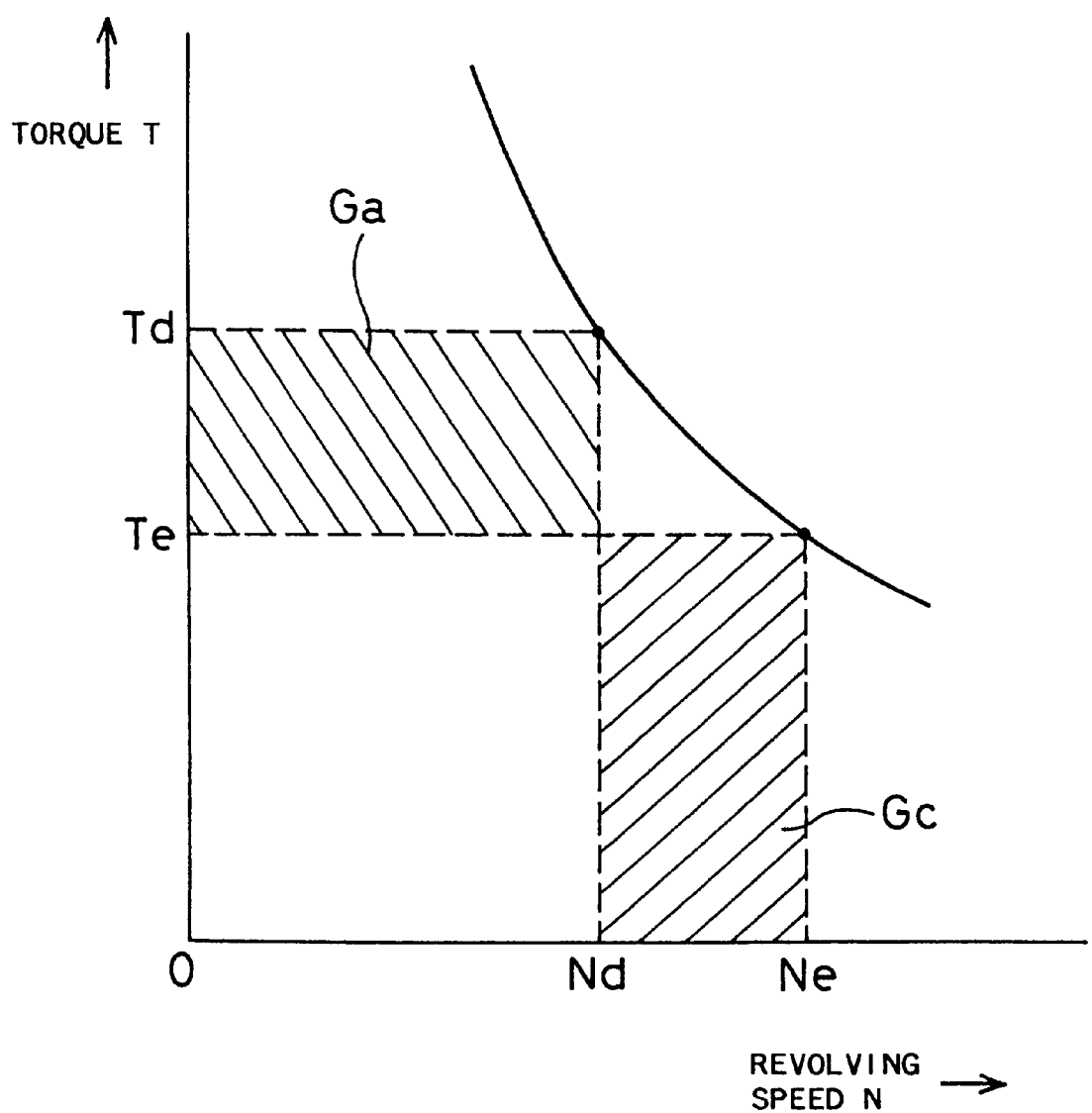
FIG. 4 is a graph schematically illustrating an amount of energy regenerated by the clutch motor 30 and that consumed by the assist motor 40.

FIG. 4 is a graph schematically illustrating an amount of energy regenerated by the clutch motor 30 and that consumed by the assist motor 40. While the crankshaft 56 of the gasoline engine 50 is driven at a revolving speed Ne and a torque Te, energy in a region Gc is regenerated as electric power by the clutch motor 30. The regenerated power is supplied to the assist motor 40 and converted to energy in a region Ga, which enables the drive shaft 22 to rotate at a revolving speed Nd and a torque Td. The torque conversion is carried out in the manner discussed above, and the energy corresponding to the slip in the clutch motor 30 or the revolving speed difference (Ne−Nd) is consequently given as a torque to the drive shaft 22.

When the revolving speed Nd of the drive shaft 22 has increased to be higher than the revolving speed Ne of the crankshaft 56 of the gasoline engine 50 (Nd>Ne), the vehicle falls in the overdrive state. At this moment, the inner rotor 34 starts rotating at a revolving speed higher than that of the outer rotor 32 in the clutch motor 30. When the control CPU 90 of the controller 80 outputs the first control signal SW1 to control on and off the transistors Tr1 through Tr6 in the first driving circuit 91 under the overdrive condition, the clutch motor 30 functions as a normal motor. Namely the clutch motor 30 carries out the power operation to enhance the speed of rotation of the inner rotor 34 relative to the outer rotor 32. This further increases the revolving speed Nd of the drive shaft 22 relative to the revolving speed Ne of the gasoline engine 50. While functioning as a normal motor, the clutch motor 30 consumes the electrical energy.

In order to allow the assist motor 40 to regenerate energy identical with the electrical energy consumed by the clutch motor 30, the control CPU 90 controls on and off the transistors Tr11 through Tr16 in the second driving circuit 92. The on-off control of the transistors Tr11 through Tr16 enables the assist motor 40 to carry out the regenerative operation. An electric current thus flows through the three-phase coils 44 of the assist motor 40, and electric power is consequently regenerated via the second driving circuit 92. The regenerated power is supplied to the clutch motor 30 to make up for the electrical energy consumed by the clutch motor 30.

Figure 5:
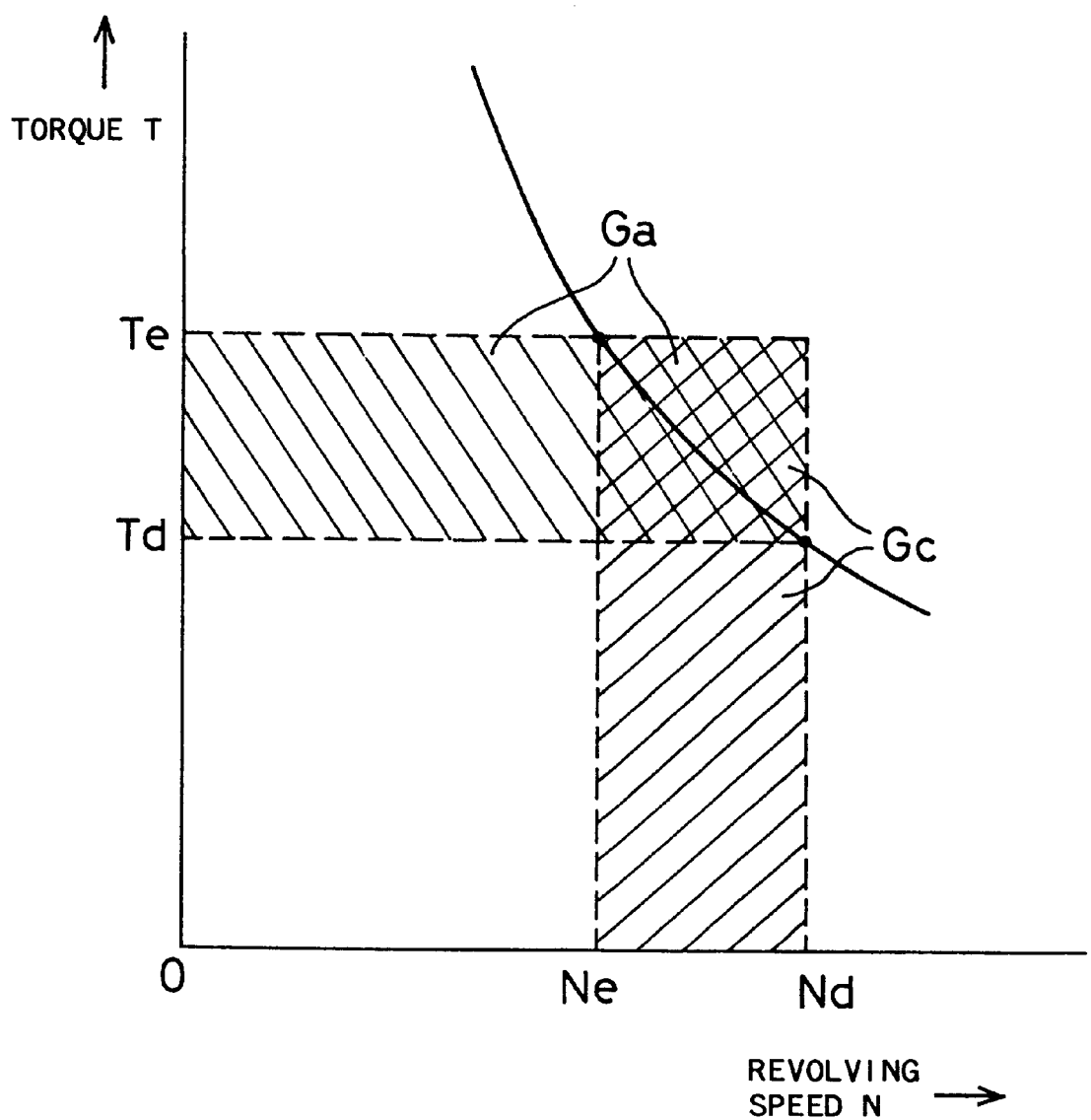
FIG. 5 is a graph schematically illustrating an amount of energy consumed by the clutch motor 30 and that regenerated by the assist motor 40 in the overdrive state.

FIG. 5 is a graph schematically illustrating an amount of energy consumed by the clutch motor 30 and that regenerated by the assist motor 40. By way of example, it is assumed that the crankshaft 56 of the gasoline engine 50 is driven at a revolving speed Ne and a torque Te and that the drive shaft 22 is rotated at a revolving speed Nd and a torque Td. In this state, energy in a region Ga is regenerated as electric power by the assist motor 40. The regenerated power is supplied to the clutch motor 30 and converted to energy in a region Gc, which is eventually consumed by the clutch motor 30. With a decrease in torque Td of the drive shaft 22 (that is, output torque) against the torque Te of the gasoline engine 50, the revolving speed Nd of the drive shaft 22 increases against the revolving speed Ne of the gasoline engine 50 (that is, the revolving speed of the crankshaft 56).

Other than the torque conversion and revolving speed conversion discussed above, the power output apparatus 20 of the embodiment can charge the battery 94 with an excess of electrical energy or discharge the battery 94 to supplement the electrical energy. This is implemented by controlling the mechanical energy output from the gasoline engine 50 (that is, the product of the torque Te and the revolving speed Ne), the electrical energy regenerated or consumed by the clutch motor 30, and the electrical energy regenerated or consumed by the assist motor 40. The output energy from the gasoline engine 50 can thus be transmitted as power to the drive shaft 22 at a higher efficiency.

Figure 6:
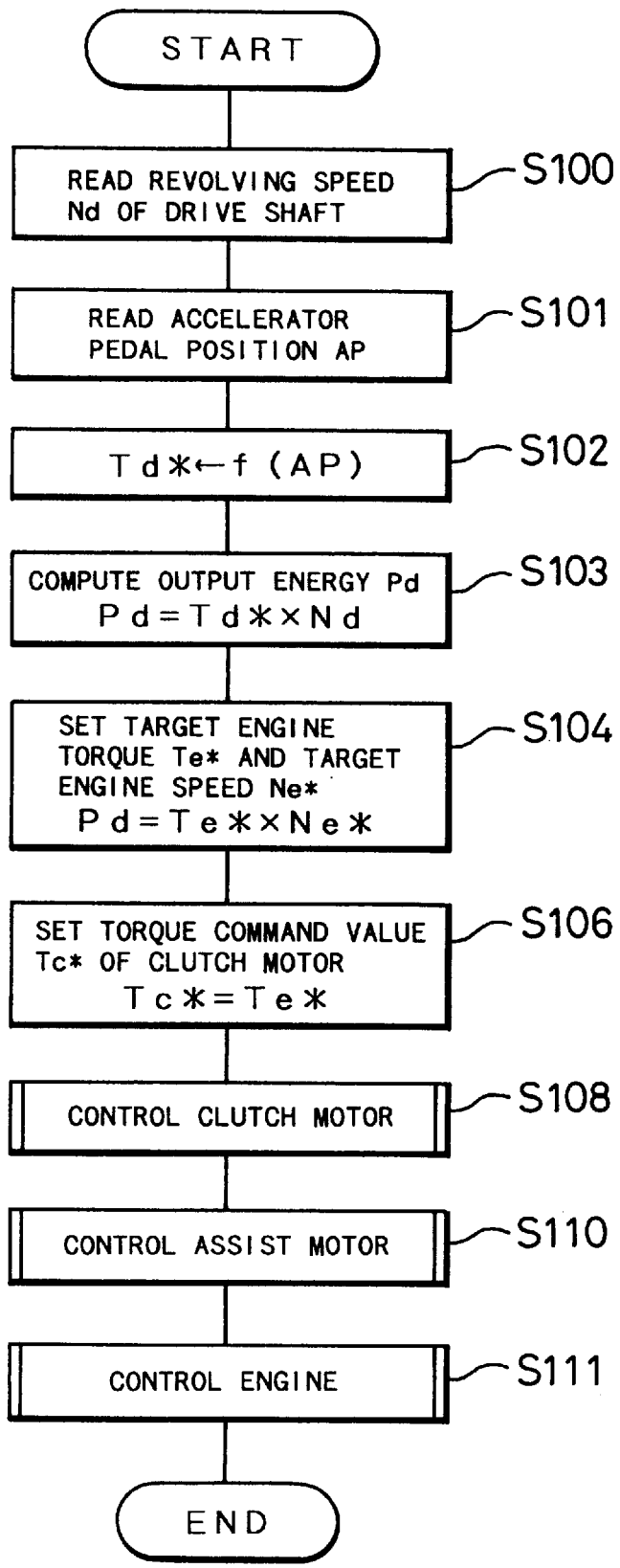
FIG. 6 is a flowchart showing a control process of the first embodiment executed by the control CPU 90 to drive the vehicle forward.

The following describes a general control procedure executed by the controller 80 to drive the vehicle forward, that is, to rotate the drive shaft 22 in the direction of rotation of the crankshaft 56 of the gasoline engine 50. FIG. 6 is a flowchart showing a control process of the first embodiment executed by the control CPU 90 to drive the vehicle forward.

When the program enters the routine, the control CPU 90 first receives data of revolving speed Nd of the drive shaft 22 at step S100. The revolving speed Nd of the drive shaft 22 can be computed from the rotational angle Od of the drive shaft 22 read from the resolver 48. At subsequent step S101, the control CPU 90 reads the accelerator pedal position AP output from the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S102 at which the control CPU 90 computes a target output torque Td* (of the drive shaft 22) corresponding to the input accelerator pedal position AP. The target output torque Td* is also referred to as the output torque command value. Output torque command values Td* have been set previously for the respective accelerator pedal positions AP. In response to an input of the accelerator pedal position AP, the output torque command value Td* is extracted from the input accelerator pedal position AP.

At step S103, an amount of energy Pd to be output from the drive shaft 22 is calculated according to the expression Pd=Td*×Nd, that is, multiplying the extracted output torque command value Td* (of the drive shaft 22) by the input revolving speed Nd of the drive shaft 22. The program then proceeds to step S104 at which the control CPU 90 sets a target engine torque Te* and a target engine speed Ne* of the gasoline engine 50 based on the output energy Pd thus obtained. Here it is assumed that all the energy Pd to be output from the drive shaft 22 is supplied by the gasoline engine 50. Since the mechanical energy supplied from the gasoline engine 50 is equal to the product of the torque Te and the revolving speed Ne of the gasoline engine 50, the relationship between the output energy Pd, the target engine torque Te*, and the target engine speed Ne* can be expressed as Pd=Te*×Ne*. There are, however, numerous combinations of the target engine torque Te* and the target engine speed Ne* satisfying the above relationship. In this embodiment, an optimal combination of the target engine torque Te* and the target engine speed Ne* is selected in order to realize operation of the gasoline engine 50 at the possible highest efficiency.

At subsequent step S106, the control CPU 90 determines a torque command value Tc* of the clutch motor 30 based on the target engine torque Te* set at step S104. In order to keep the revolving speed Ne of the gasoline engine 50 at a substantially constant level, it is required to make the torque of the clutch motor 30 balance the torque of the gasoline engine 50. The processing at step S106 accordingly sets the torque command value TC* of the clutch motor 30 equal to the target engine torque Te*.

After setting the torque command value Tc* of the clutch motor 30 at step S106, the program proceeds to steps S108, S110, and S111 to control the clutch motor 30, the assist motor 40, and the gasoline engine 50, respectively. As a matter of convenience of illustration, the control operations of the clutch motor 30, the assist motor 40, and the gasoline engine 50 are shown as separate steps. In the actual procedure, however, these control operations are carried out comprehensively. For example, the control CPU 90 simultaneously controls the clutch motor 30 and the assist motor 40 by interrupt processing, while transmitting an instruction to the EFIECU 70 through communication to control the gasoline engine 50 concurrently.

Figure 7:
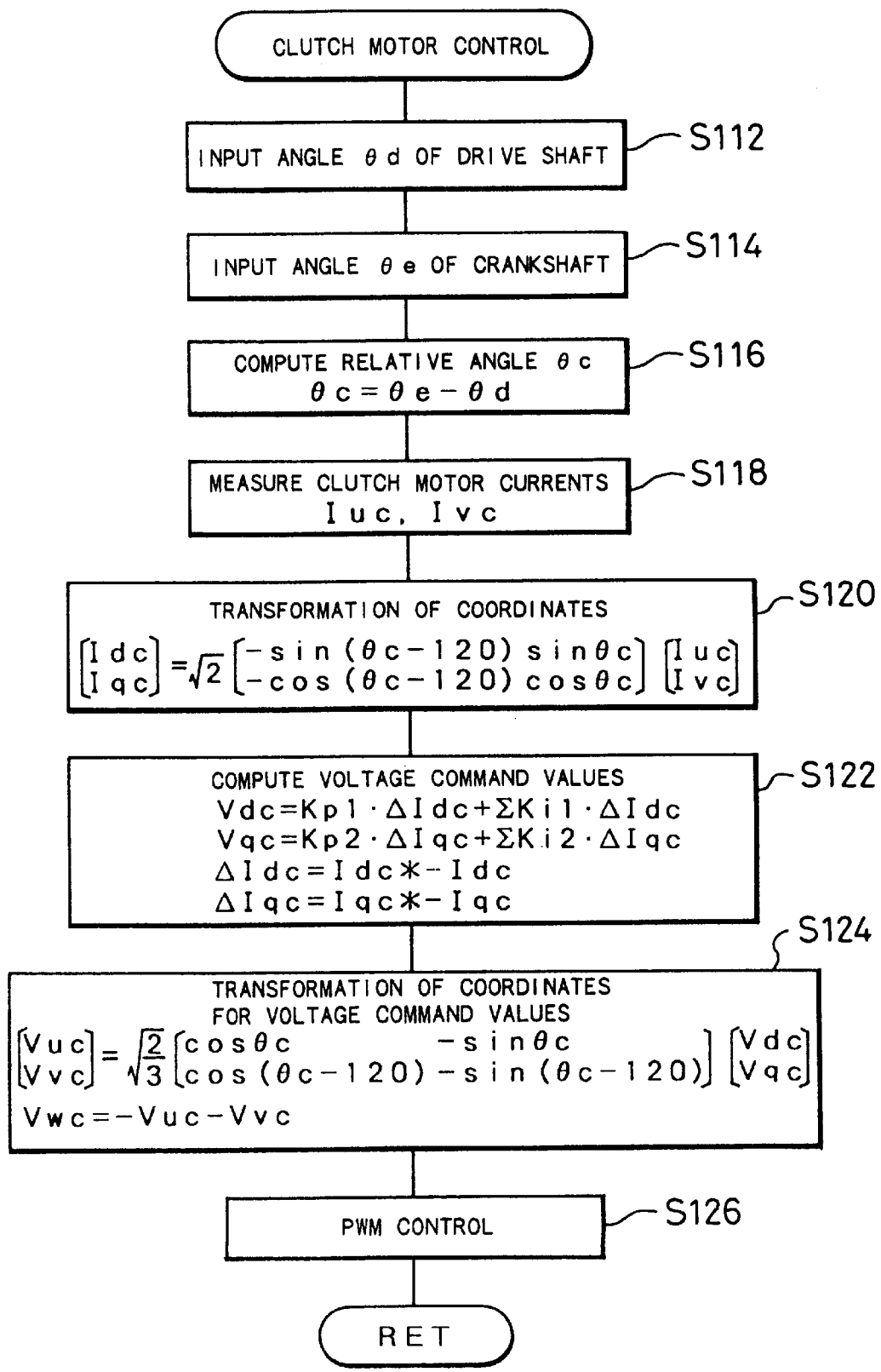
FIG. 7 is a flowchart showing details of the control process of the clutch motor 30 executed at step S108 in the flowchart of FIG. 6.

FIG. 7 is a flowchart showing details of the control process of the clutch motor 30 executed at step S108 in the flowchart of FIG. 6. When the program enters the clutch motor control routine, the control CPU 90 of the controller 80 first reads the rotational angle θd of the drive shaft 22 from the resolver 48 at step S112 and the rotational angle θe of the crankshaft 56 of the gasoline engine 50 from the resolver 39 at step S114. The control CPU 90 then computes a relative angle θc of the drive shaft 22 and the crankshaft 56 by the equation θc=θe−θd at step S116.

The program proceeds to step S118, at which the control CPU 90 receives data of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and Vqc for the d and q axes at step S122. In accordance with a concrete procedure, the control CPU 90 executes operations following Equations (2) and Equations (3) given below:

$$\Delta Idc = Idc^* - Idc$$

$$\Delta Iqc = Iqc^* - Iqc \quad (2)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied.

The voltage command value Vdc (Vqc) includes a part in proportion to the deviation ΔI from the current command value I* (first term in right side of Equation (3)) and a summation of historical data of the deviations ΔI for 'i' times (second term in right side). The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \quad (4)$$
$$Vwc = -Vuc - Vvc$$

The actual voltage control is accomplished by on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values Vuc, Vvc, and Vwc determined by Equation (4) above. This process enables the clutch motor 30 to mechanically transmit the target torque to the drive shaft 22.

Figure 8:
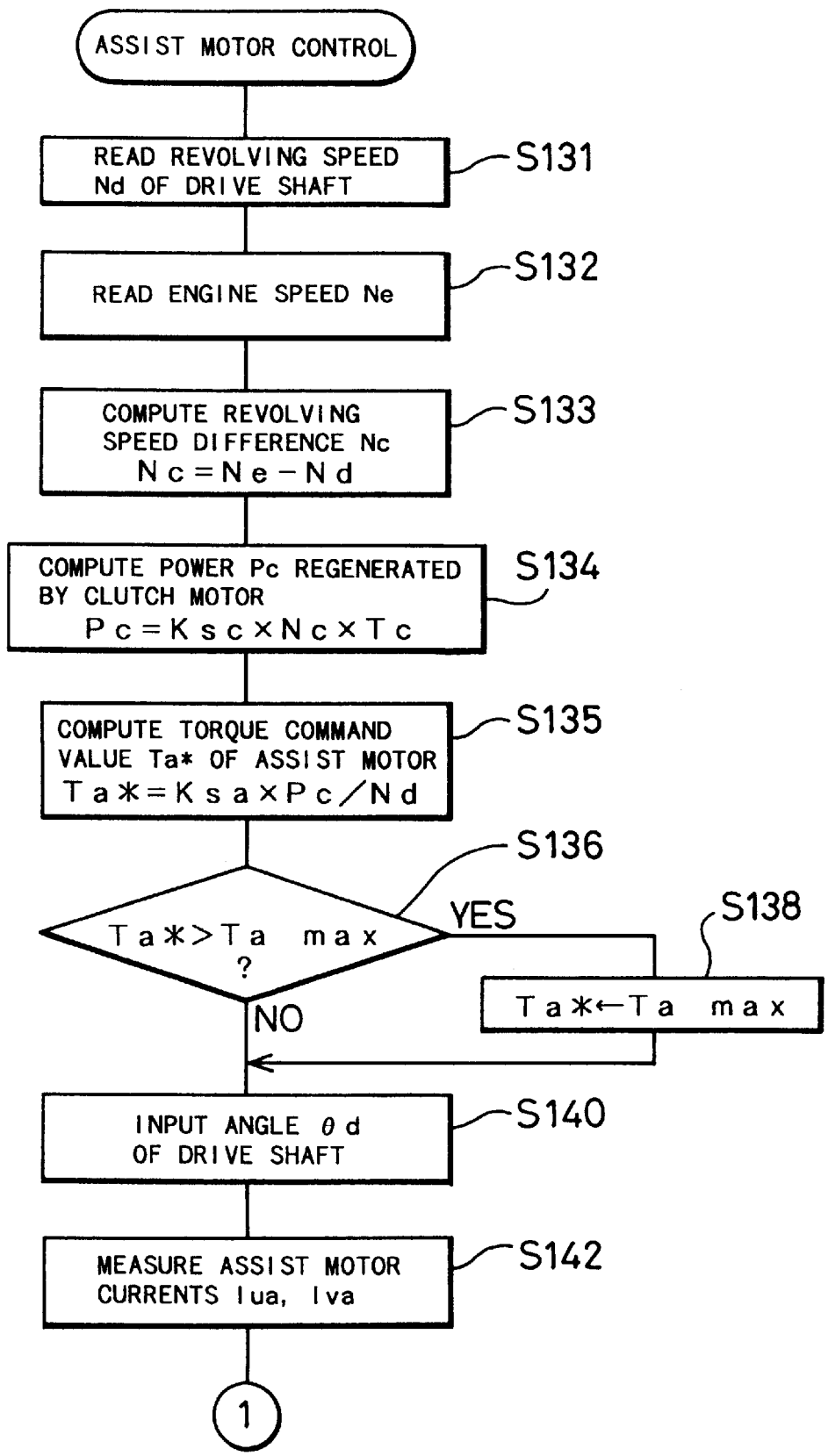
FIGS. 8 and 9 are flowcharts showing details of the control process of the assist motor 40 executed at step S110 in the flowchart of FIG. 6.
Figure 9:
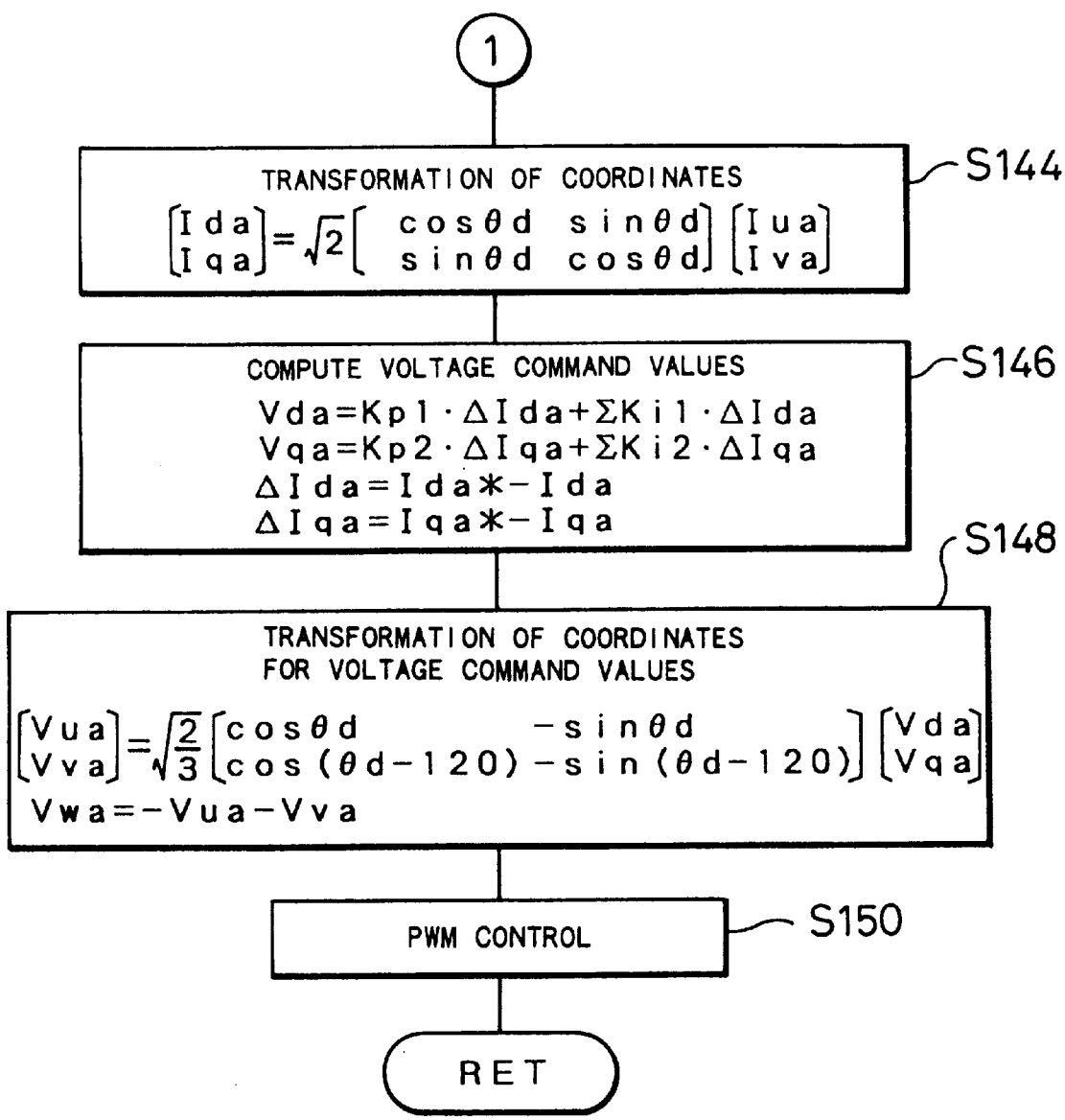

FIGS. 8 and 9 are flowcharts showing details of the control process of the assist motor 40 executed at step S110 in the flowchart of FIG. 6. Referring to the flowchart of FIG. 8, when the program enters the assist motor control routine, the control CPU 90 first receives data of revolving speed Nd of the drive shaft 22 at step S131. The revolving speed Nd of the drive shaft 22 is computed from the rotational angle θd of the drive shaft 22 read from the resolver 48. The control CPU 90 then receives data of revolving speed Ne of the gasoline engine 50 at step S132. The revolving speed Ne of the gasoline engine 50 may be computed from the rotational angle θe of the crankshaft 56 read from the resolver 39 or directly measured by the speed sensor 76 mounted on the distributor 60. In the latter case, the control CPU 90 receives data of revolving speed Ne of the gasoline engine 50 through communication with the EFIECU 70, which connects with the speed sensor 76.

A revolving speed difference Nc between the input revolving speed Nd of the drive shaft 22 and the input revolving speed Ne of the gasoline engine 50 is calculated according to the equation Nc=Ne−Nd at step S133. At subsequent step S134, electric power (energy) Pc regenerated by the clutch motor 30 is calculated according to the expression given as:

$$Pc = Ksc \times Nc \times Tc$$

wherein Ksc represents an efficiency of regenerative operation in the clutch motor 30. The product Nc×Tc defines energy in the region Gc of FIG. 4, wherein Nc and Tc respectively denote the revolving speed difference and the actual torque produced by the clutch motor 30.

At step S135, a torque command value Ta* of the assist motor 40 is determined by the expression given as:

$$Ta^* = Ksa \times Pc/Nd$$

wherein ksa represents an efficiency of power operation in the assist motor 40. The torque command value Ta* of the assist motor 40 thus obtained is compared with a maximum torque Tamax, which the assist motor 40 can potentially apply, at step S136. When the torque command value Ta* exceeds the maximum torque Tamax, the program proceeds to step S138 at which the torque command value Ta* is restricted to the maximum torque Tamax.

After the torque command value Ta* is set equal to the maximum torque Tamax at step S138 or after the torque command value Ta* is determined not to exceed the maximum torque Tamax at step S136, the control CPU 90 reads the rotational angle θd of the drive shaft 22 from the resolver 48 at step S140, and receives data of assist motor currents Iua and Iva, which respectively flow through the U phase and V phase of the three-phase coils 44 in the assist motor 40, from the ammeters 97 and 98 at step S142. Referring to the flowchart of FIG. 9, the control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on- and off-time of the transistors Tr11 through Tr16 in the second driving circuit 92 for PWM (pulse width modulation) control. The processing executed at steps S144 through S150 is similar to that executed at steps S120 through S126 of the clutch motor control routine shown in the flowchart of FIG. 7.

The control of the gasoline engine 50 (step S111 in FIG. 6) is executed in the following manner. In order to attain stationary driving at the target engine torque Te* and the target engine speed Ne* (set at step S104 in FIG. 6), the control CPU 90 regulates the torque Te and the revolving speed Ne of the gasoline engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the gasoline engine 50 eventually approach the target engine torque Te* and the target engine speed Ne*.

According to the process described above, the clutch motor 30 converts the torque to electric power at the predetermined efficiency Ksc. In other words, the clutch motor 30 regenerates electric power in proportion to the difference between the revolving speed of the crankshaft 56 of the gasoline engine 50 and the revolving speed of the inner rotor 34 of the clutch motor 30. The assist motor 40 receives the electric power thus regenerated and applies a corresponding torque to the drive shaft 22. The torque applied to the drive shaft 22 by the assist motor 40 coincides with the torque converted to electric power by the clutch motor 30. In the graph of FIG. 4, the energy in the region Gc is converted to that in the region Ga to implement the torque conversion.

There is naturally a certain amount of energy loss in the clutch motor 30, the assist motor 40, the first driving circuit 91, and the second driving circuit 92. It is accordingly rare that the energy in the region Gc perfectly coincides with the energy in the region Ga under the actual condition. The energy loss in the clutch motor 30 and the assist motor 40 is relatively small since some synchronous motors recently developed have the efficiency very close to 1. The energy loss in the first driving circuit 91 and the second driving circuit 92 can also be sufficiently small since the ON-state resistance of known transistors, such as GTOs, applicable to Tr1 through Tr16 is extremely small. Most part of the revolving speed difference or the slip between the rotations of the drive shaft 22 and the crankshaft 56 is thus converted to energy for generation by the three-phase coils 36 and transmitted as a torque to the drive shaft 22 by the assist motor 40.

The following describes a general control procedure executed by the controller 80 to drive the vehicle in reverse, that is, to rotate the drive shaft 22 in the reverse of the rotation of the crankshaft 56 of the gasoline engine 50. As mentioned above, the prime mover used in the embodiment is the gasoline engine 50. It is, however, impossible to rotate the output shaft of an internal combustion engine, such as the gasoline engine 50, in the reverse direction. Based on the reasonable premise that the reverse movement of the vehicle is generally required only for a short time period and for a short distance, the power output apparatus 20 is operated in the following manner. Electric power stored in the battery 94 is primarily used as the energy required for the rearward movement of the vehicle. When the battery 94 does not have a sufficient residual capacity, electric power regenerated by the clutch motor 30 is used to move the vehicle back.

Figure 10:
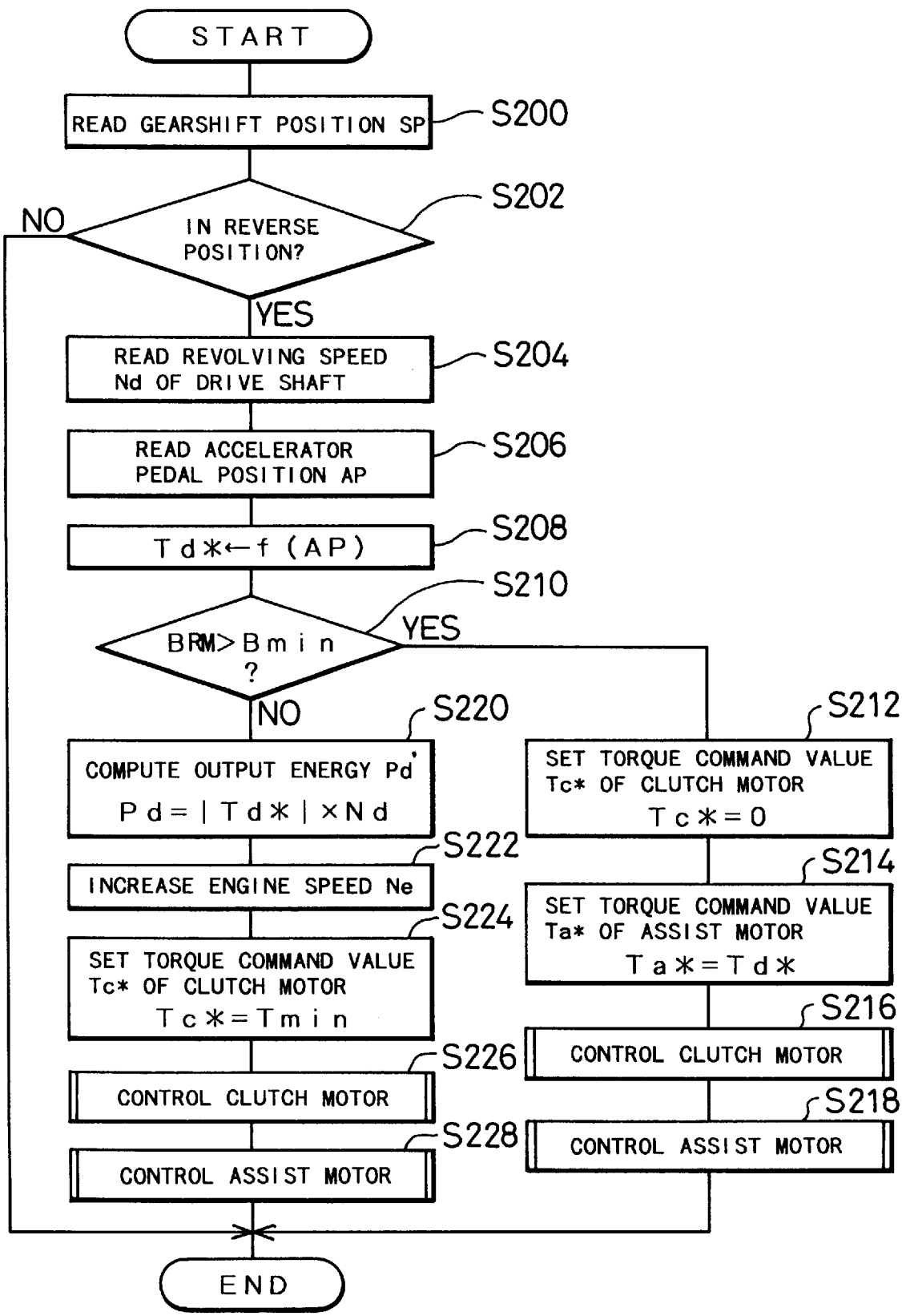
FIG. 10 is a flowchart showing a control process of the first embodiment executed by the control CPU 90 to drive the vehicle in reverse.

FIG. 10 is a flowchart showing a control process of the first embodiment executed by the control CPU 90 to drive the vehicle in reverse. When the program enters the routine, the control CPU 90 of the controller 80 first reads the gearshift position SP output from the gearshift position sensor 84 at step S200 and determines whether the gearshift 82 is in reverse position at step S202. When the gearshift 82 is in reverse position, the program determines that the driver requires driving in reverse and proceeds to step S204. When the gearshift 82 is not in reverse position, on the contrary, the program determines that the driver does not require driving in reverse and exits from the routine.

At step S204, the control CPU 90 receives data of revolving speed Nd of the drive shaft 22. Under the condition of this routine, the drive shaft 22 is rotated in the reverse of the rotation of the crankshaft 56 of the gasoline engine 50, that is, in the reverse of the rotation detected at step S100 in the flowchart of FIG. 6. The control CPU 90 then reads the accelerator pedal position AP output from the accelerator position sensor 65 at step S206, and computes the output torque command value Td* (of the drive shaft 22) corresponding to the input accelerator pedal position AP at step S208. In order to move the vehicle in reverse, the output torque Td (of the drive shaft 22) should act in the reverse of the rotation of the crankshaft 56 of the gasoline engine 50. The output torque command value Td* computed at step S208 accordingly has the negative sign, whereas the output torque command value Td* computed at step S102 in the flowchart of FIG. 6 has the positive sign.

The control CPU 90 receives the output of the residual capacity meter 99 and compares the residual capacity BRM of the battery 94 with a reference minimum level Bmin at step S210. When the residual capacity BRM is greater than the reference minimum level Bmin, the program determines that the residual capacity BRM of the battery 94 is sufficient and proceeds to step S212 and subsequent steps to drive the vehicle in reverse only with the electric power stored in the battery 94. When the residual capacity BRM is not greater than the reference minimum level Bmin, on the other hand, the program determines that the residual capacity BRM of the battery 94 is insufficient and proceeds to step S220 and subsequent steps to enable the clutch motor 30 to regenerate electric power and to drive the vehicle in reverse with the electric power regenerated by the clutch motor 30.

A concrete procedure of the former control (control of steps S212 through S218) is described in detail. The control CPU 90 sets the torque command value Tc* of the clutch motor 30 at step S212. The torque command value Tc* of the clutch motor 30 is set equal to zero in order to disconnect the drive shaft 22 from the crankshaft 56.

The control CPU 90 then determines the torque command value Ta* of the assist motor 40 at step S214. The drive shaft 22 generally receives a torque Tc produced by the clutch motor 30 and a torque Ta produced by the assist motor 40. Since the torque command value Tc* of the clutch motor 30 is set equal to zero at step S212, however, the drive shaft 22 receives only the torque Ta of the assist motor 40 as the output torque Td. The torque command value Ta* of the assist motor 40 is thus set equal to the output torque command value Td* computed at step S208. As discussed above, the output torque command value Td* should have the negative sign in order to move the vehicle in reverse. The torque command value Ta* of the assist motor 40 set at step S214 accordingly has the negative sign, whereas the torque command value Ta* of the assist motor 40 computed at step S135 in the flowchart of FIG. 8 has the positive sign.

At step S216, the control CPU 90 controls the clutch motor 30 based on the torque command value Tc* of the clutch motor 30 set at step S212. The concrete procedure of the clutch motor control is identical with that described above according to the flowchart of FIG. 7. The clutch motor control makes the torque Tc of the clutch motor 30 equal to zero and substantially releases the electromagnetic coupling of the outer rotor 32 with the inner rotor 34 in the clutch motor 30. The clutch motor 30 accordingly does not carry out either the regenerative operation or the power operation. The clutch motor control also makes the crankshaft 56 of the gasoline engine 50 free from loading, so that the gasoline engine 50 is kept at an idle.

At step S218, the control CPU 90 controls the assist motor 40 based on the torque command value Ta* of the assist motor 40 set at step S214. The concrete procedure of the assist motor control is similar to the processing of step S136 and subsequent steps in the flowcharts of FIGS. 8 and 9. In the assist motor control of step S218, Tamax at steps S136 and S138 in the flowchart of FIG. 8 represents a maximum torque which the assist motor 40 can apply during the reverse rotation of the assist motor 40. The assist motor control enables the assist motor 40 to carry out the reverse power operation and rotate in the reverse of the rotation of the crankshaft 56 of the gasoline engine 50. The assist motor 40 accordingly produces the torque Ta, which acts in the reverse of the rotation of the crankshaft 56 and is given to the drive shaft 22 as the output torque Td. Although the torque command value Tc* of the clutch motor 30 is set equal to zero in the control process described above, the torque command value TC* may be set alternatively equal to or less than a predetermined value to enable the clutch motor 30 to produce a small torque.

A concrete procedure of the latter control (control of steps S220 through S228) is described in detail. At step S220, the control CPU 90 calculates output energy Pd of the drive shaft 22 from the output torque command value Td* (of the drive shaft 22) computed at step S208 and the revolving speed Nd of the drive shaft 22 read at step S204; Pd=|Td*|× Nd. Since the output torque command value Td* has the negative sign in this routine, the absolute value of the output torque command value Td* is used for the calculation of the output energy Pd.

In order to enable the gasoline engine 50 to supply energy sufficient for the output energy Pd of the drive shaft 22 calculated at step S220, the control CPU 90 increases the revolving speed Ne of the gasoline engine 50 (engine speed). In accordance with a concrete procedure, the control CPU 90 sends an instruction to the EFIECU 70 through communication to increase the amount of fuel injection and thereby enhance the energy supplied by the gasoline engine 50 within the high-efficiency speed range of the gasoline engine 50. The torque command value Tc* of the clutch motor 30 is set equal to a desired value Tmin at step S224, in order to minimize the torque Tc of the clutch motor 30, that is, the torque Te of the gasoline engine 50 (engine torque).

At step S226, the control CPU 90 controls the clutch motor 30 based on the torque command value Tc* of the clutch motor 30 set at step S224. The concrete procedure of the clutch motor control is identical with that described above according to the flowchart of FIG. 7. The clutch motor control enables the clutch motor 30 to rotate with a low torque and at a high speed and carry out the regenerative operation. While the outer rotor 32 of the clutch motor 30 rotates in the direction of rotation of the crankshaft 56, the inner rotor 34 rotates in the reverse of the rotation of the crankshaft 56. This results in a large revolving speed difference Nc between the outer rotor 32 and the inner rotor 34 (that is, a large revolving speed of the clutch motor 30). The clutch motor 30 carries out the regenerative operation to regenerate energy corresponding 5 to the product of the revolving speed difference Nc, the torque Tc, and the efficiency of regenerative operation Ksc as electric power.

At subsequent step S228, the control CPU 90 controls the assist motor 40 according to the assist motor control routine shown in the flowcharts of FIGS. 8 and 9. The assist motor control enables the assist motor 40 to carry out the reverse power operation with the electric power regenerated by the clutch motor 30 and rotate in the reverse of the rotation of the crankshaft 56 of the gasoline engine 50. The assist motor 40 accordingly produces the torque Ta acting in the reverse of the rotation of the crankshaft 56. The drive shaft 22 receives the torque Tc produced by the clutch motor 30 in the direction of rotation of the crankshaft 56 and the torque Ta produced by the assist motor 40 in the reverse of the rotation of the crankshaft 56. The torque Ta of the assist motor 40 is greater than the torque Tc of the clutch motor 30. The resulting output torque Td has the magnitude of |Tc−Ta| and acts in the reverse of the rotation of the crankshaft 56.

In the flowchart of FIG. 10, as a matter of convenience of illustration, the control operations of the clutch motor 30 and the assist motor 40 are shown as separate steps. In the actual procedure, however, these control operations are carried out comprehensively. For example, the control CPU 90 simultaneously controls the clutch motor 30 and the assist motor 40 by interrupt processing.

Figure 11:
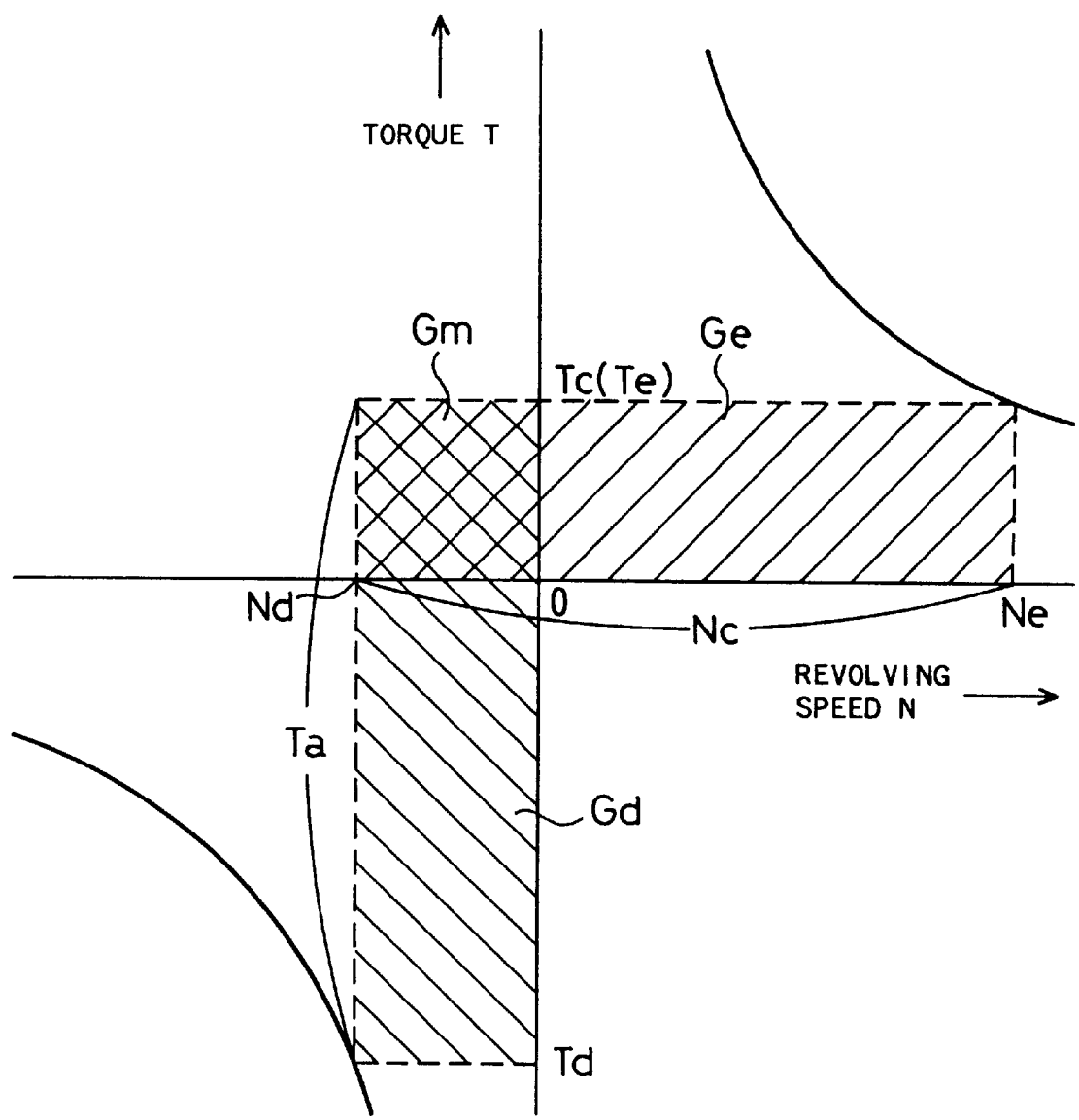
FIG. 11 is a graph schematically illustrating an amount of energy regenerated by the clutch motor 30 and that consumed by the assist motor 40.

FIG. 11 is a graph schematically illustrating an amount of energy regenerated by the clutch motor 30 and that consumed by the assist motor 40. As clearly shown in FIG. 11, the gasoline engine 50 rotating at an engine speed Ne and an engine torque Te produces energy corresponding to a region Ge. On the assumption that the drive shaft 22 rotates at a revolving speed Nd in the reverse of the rotation of the crankshaft 56 of the gasoline engine 50, the latter control (control of steps S220 through S228) enables the clutch motor 30 to regenerate energy corresponding to the sum of regions (Ge+Gm) as electric power. The regenerated power is supplied to the assist motor 40, which consumes energy corresponding to the sum of regions (Gd+Gm). This means that the energy in the region Ge is converted to that in the region Gd. The drive shaft 22 consequently outputs the torque difference (Tc−Ta) as the output torque Td, that is the drive shaft 22 outputs the energy in the region Ge.

There is a certain amount of energy loss in the process of regenerating electric power in the clutch motor 30, transmitting the regenerated power to the assist motor 40, and consuming the transmitted power in the assist motor 40. It is accordingly rare that the energy in the region Ge perfectly coincides with the energy in the region Gd in the practical operation. The energy loss in the clutch motor 30 and the assist motor 40 is, however, relatively small since some synchronous motors recently developed have the efficiency very close to 1.

Figure 12A:
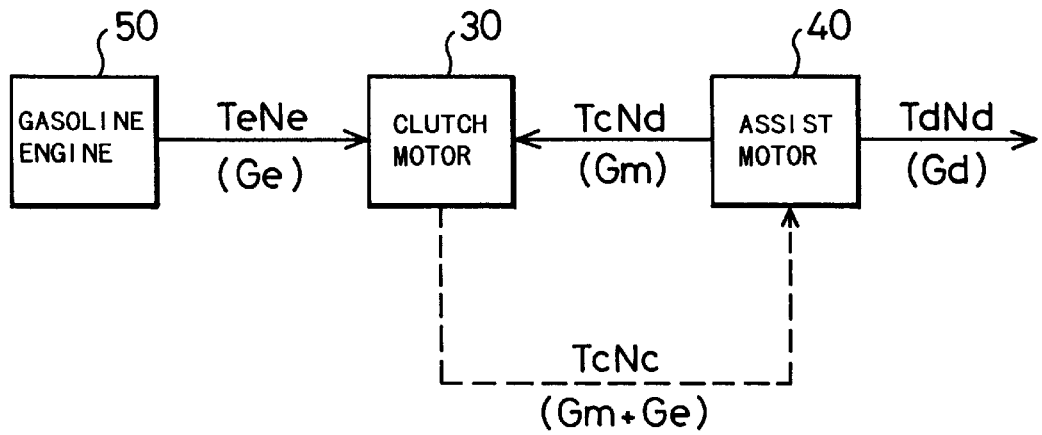
FIGS. 12(a) through 12(c) show a flow of energy between the gasoline engine 50, the clutch motor 30, the assist motor 40 and the battery 94.

FIG. 12(a) shows a flow of energy between the gasoline engine 50, the clutch motor 30, the assist motor 40 and the battery 94. In FIG. 12, the arrow of the solid line shows a flow of mechanical energy and the arrow of the broken line shows a flow of electrical energy.

As shown in FIG. 12(a), the clutch motor 30 receives mechanical energy Te×Ne in the region Ge produced by the gasoline engine 50 and mechanical energy Tc×Nd in the region Gm transmitted from the assist motor 40. The clutch motor 30 converts the total mechanical energy to electrical energy Tc×Nc corresponding to the sum of the regions Gm+Ge. The converted electrical energy is supplied to the assist motor 40. The assist motor 40 then converts the electrical energy supplied from the clutch motor 30 to mechanical energy Ta×Nd corresponding to the sum of the regions Gm+Gd. Part of the mechanical energy Tc×Nd corresponding to the region Gm is transmitted to the clutch motor 30, whereas the residual mechanical energy Td×Nd corresponding to the region Gd is output from the drive shaft 22.

The above process allows the drive shaft 22 to rotate in the reverse of the rotation of the crankshaft 56 of the gasoline engine 50, thereby moving the vehicle back. The energy required for driving the vehicle in reverse is primarily covered by the electric power stored in the battery 94. When the battery 94 does not have a sufficient residual capacity, electric power regenerated by the clutch motor 30 is used to move the vehicle back. This structure allows the vehicle to be driven in reverse without applying undesirable loading to the battery 94. The structure does not require any specific gear for the reverse movement of the vehicle and thereby reduces the total weight of equipment mounted on the vehicle, saves the time and labor for the assembly, and decreases the manufacturing cost.

As discussed above, the structure of the first embodiment can efficiently transmit or utilize the power produced by the gasoline engine 50, thereby improving the fuel consumption. The structure also enables the drive shaft 22 to rotate in the reverse of the rotation of the crankshaft 56 of the gasoline engine 50 in order to move the vehicle back.

Figure 12B:
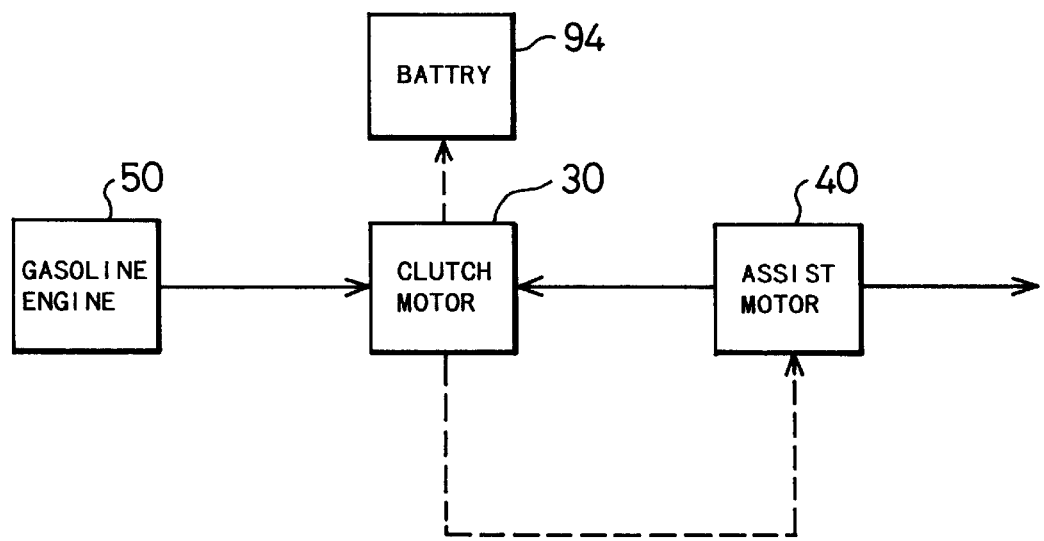

In accordance with a possible modification, when the residual capacity BRM of the battery 94 is not greater than the reference minimum level Bmin, the revolving speed Ne of the gasoline engine 50 (engine speed) may be further increased to a higher level at step S222 in the flowchart of FIG. 10. This enhances the energy supplied by the gasoline engine 50 and enables the clutch motor 30 to regenerate electric power greater than the energy consumed by the assist motor 40. Therefore, the battery 94 can be charged with the excess of electric power. In this case, a flow of energy between the gasoline engine 50, the clutch motor 30, the assist motor 40 and the battery 94 is as shown in FIG. 12(b).

Figure 12C:
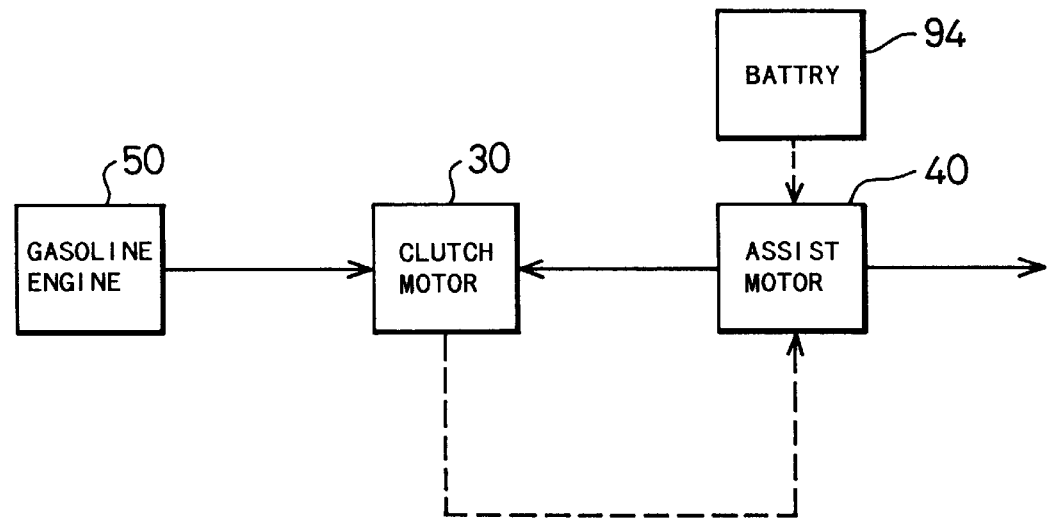

In accordance with another possible modification, when the battery 94 with the residual capacity BRM of not greater than the reference minimum level Bmin still has some marginal power, the assist motor 40 may be driven with the electric power stored in the battery 94 as well as the electric power regenerated by the clutch motor 30 to rotate the drive shaft 22 in the reverse direction. In this case, a flow of energy between the gasoline engine 50, the clutch motor 30, the assist motor 40 and the battery 94 is as shown in FIG. 12(c).

The power output apparatus 20 of the first embodiment can go into another application given as a second embodiment of the present invention. In the first embodiment, in order to move the vehicle back, the assist motor 40 is controlled to carry out the reverse power operation. The vehicle may, however, be driven in reverse by the power operation of the clutch motor 30. In the second embodiment, the clutch motor 30 is controlled to carry out the power operation with the electric power stored in the battery 94 while the crankshaft 56 of the gasoline engine 50 is at a stop. The clutch motor 30 accordingly produces a torque of not greater than the maximum static friction torque of the crankshaft 56 of the gasoline engine 50 and allows the drive shaft 22 to rotate in the reverse of the original rotation of the crankshaft 56.

Figure 13:
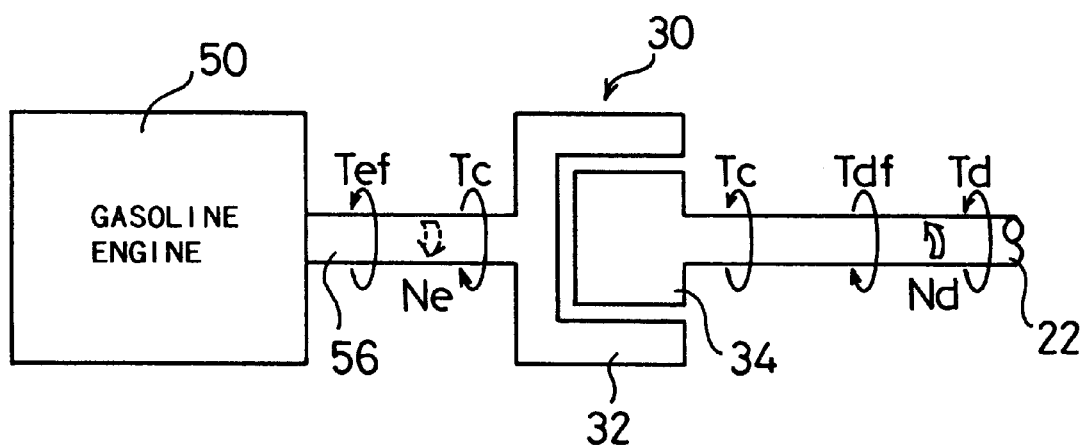
FIG. 13 shows torques applied onto the respective shafts in the power output apparatus of the second embodiment.

FIG. 13 shows torques applied onto the respective shafts of the power output apparatus in the second embodiment. In the structure of the second embodiment, the crankshaft 56, which originally rotates in the direction of the open arrow of the one-dot chain line, has stopped rotating, and the revolving speed Ne of the crankshaft 56 (engine speed) is equal to zero. The clutch motor 30 is controlled to carry out the power operation and rotate the drive shaft 22 in the reverse of the original rotation of the crankshaft 56 as shown by the open arrow of the solid line in FIG. 13. Under such conditions, the following torques are applied to the crankshaft 56 and the drive shaft 22. The crankshaft 56 receives the torque Tc produced by the clutch motor 30 and a static friction torque Tef of the crankshaft 56, which act in the opposite directions and balance each other. The drive shaft 22 receives the torque Tc produced by the clutch motor 30 and a friction torque Tdf of the drive shaft 22, which act in the opposite directions and balance each other. The torque Tc of the clutch motor 30 applied to the crankshaft 56 is a reaction of the torque Tc applied to the drive shaft 22.

The condition required for preventing the clutch motor 30 from rotating the crankshaft 56 of the gasoline engine 50 is given as:

$$\text{Tefmax} \geq \text{Tef} = \text{Tc} \tag{5}$$

wherein Tefmax denotes the maximum static friction torque of the crankshaft 56. The condition required for enabling the drive shaft 22 to rotate in the reverse of the original rotation of the crankshaft 56 is given as:

$$\text{Td} > 0 \tag{6}$$

wherein Td denotes the output torque of the drive shaft 22, which is equal to Tc−Tdf. Expression (6) is thus written as:

$$\text{Tc} > \text{Tdf} \tag{7}$$

Expressions (5) and (7) can be combined and written as:

$$\text{Tefmax} \geq \text{Tc} > \text{Tdf} \tag{8}$$

When the conditions of Expression (8) are fulfilled, the clutch motor 30 can rotate the drive shaft 22 in the reverse of the original rotation of the crankshaft 56 without rotating the crankshaft 56 of the gasoline engine 50. The maximum static friction torque of the crankshaft 56 includes not only a torque produced by the actual friction but a torque due to the resistivity produced in the process of compressing the air in a cylinder with a piston in the gasoline engine 50.

Figure 14:
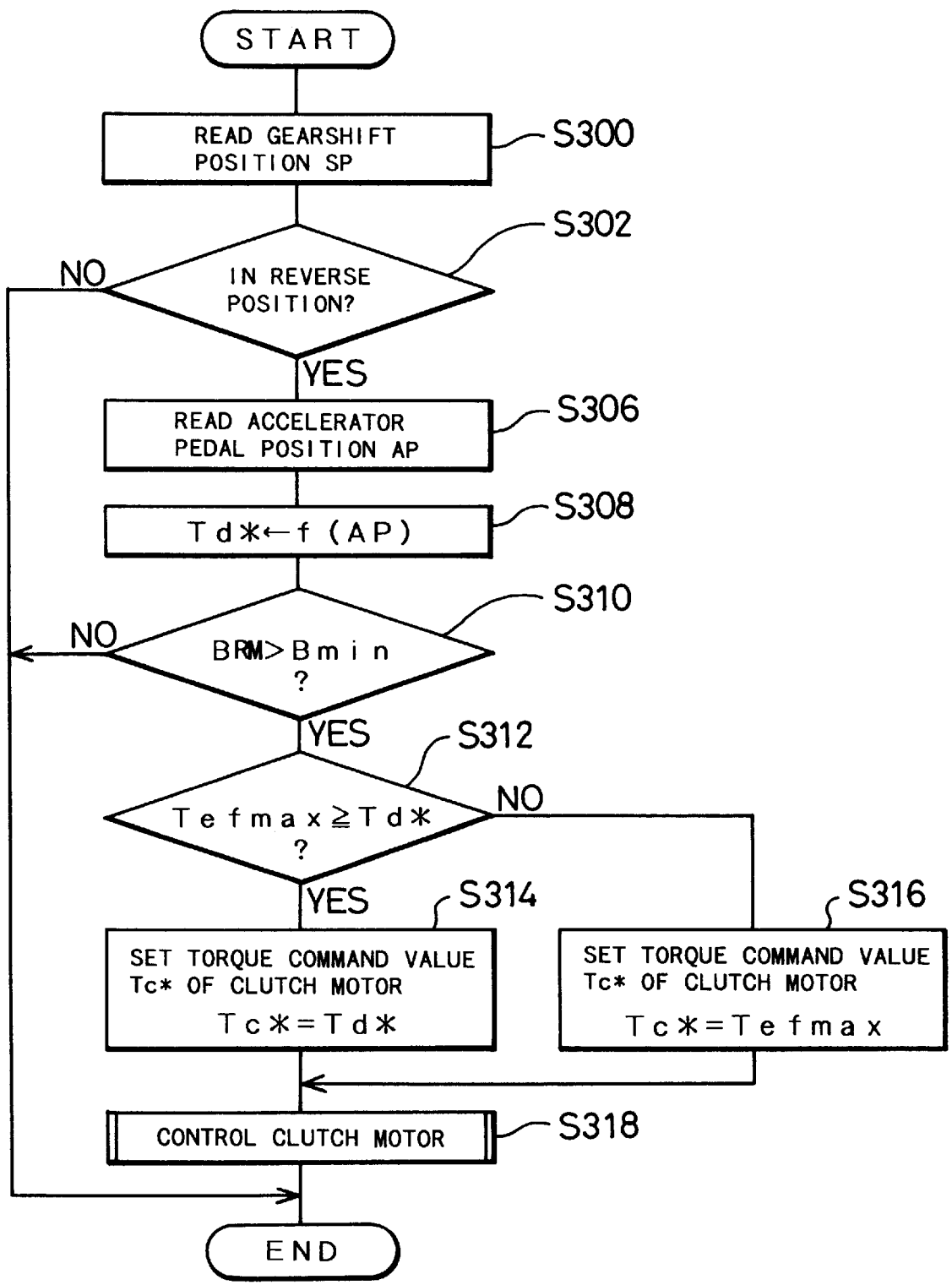
FIG. 14 is a flowchart showing a control process of the second embodiment executed by the control CPU 90 to drive the vehicle in reverse.

FIG. 14 is a flowchart showing a control process of the second embodiment executed by the control CPU 90 to drive the vehicle in reverse. This control routine is executed on the premise that the gasoline engine 50 has stopped its operation and the crankshaft 56 has stopped its rotation. In the same manner as the control routine of FIG. 10, when the program enters the routine, the control CPU 90 of the controller 80 first reads the gearshift position SP output from the gearshift position sensor 84 at step S300 and determines whether the gearshift 82 is in reverse position at step S302. When the gearshift 82 is in reverse position, the program proceeds to step S306. When the gearshift 82 is not in reverse position, on the contrary, the program exits from the routine.

The control CPU 90 reads the accelerator pedal position AP output from the accelerator position sensor 65 at step S306, and computes the output torque command value Td* (of the drive shaft 22) corresponding to the input accelerator pedal position AP at step S308. Like the output torque command value Td* computed at step S208 in the flowchart of FIG. 10, the output torque command value Td* computed at step S308 has the negative sign, whereas the output torque command value Td* computed at step S102 in the flowchart of FIG. 6 has the positive sign.

The control CPU 90 receives the output of the residual capacity meter 99 and compares the residual capacity BRM of the battery 94 with the reference minimum level Bmin at step S310. When the residual capacity BRM is greater than the reference minimum level Bmin, the program determines that the residual capacity BRM of the battery 94 is sufficient and proceeds to step S312. When the residual capacity BRM is not greater than the reference minimum level Bmin, on the other hand, the program determines that the residual capacity BRM of the battery 94 is insufficient and exits from the routine. The control routine of the second embodiment is executed on the premise that the electric power stored in the battery 94 is used for the power operation of the clutch motor 30. The program thus terminates the processing when the residual capacity BRM of the battery 94 is not sufficient.

At step S312, the output torque command value Td* computed at step S308 is compared with a predetermined maximum static friction torque Tefmax of the crankshaft 56 of the gasoline engine 50. When the output torque command value Td* is equal to or less than the maximum static friction torque Tefmax, the program goes to step S314 to set the torque command value Tc* of the clutch motor 30 equal to the output torque command value Td* required by the driver. When the output torque command value Td* is greater than the maximum static friction torque Tefmax, on the contrary, the torque command value Tc* of the clutch motor 30 is set equal to the maximum static friction torque Tefmax at step S316 to make the conditions of Expression (8) fulfilled.

After setting the torque command value Tc* of the clutch motor 30, the program goes to step S318 to control the clutch motor 30 based on the torque command value Tc* of the clutch motor 30 set either at step S314 or at step S316. The concrete procedure of the clutch motor control is identical with that shown in the flowchart of FIG. 7.

According to the control routine discussed above, the clutch motor 30 can rotate the drive shaft 22 in the reverse of the original rotation of the crankshaft 56 without rotating the crankshaft 56 of the gasoline engine 50, thereby moving the vehicle back.

Although operation of the assist motor 40 is not specifically mentioned in the above description, the assist motor 40 can follow any of the three choices given below. The first choice is to keep the assist motor 40 in non-operating state. In this case, the vehicle is driven in reverse only by the clutch motor 30. The second choice is to make the assist motor 40 carry out the power operation. In this case, the torque produced by the assist motor 40 acts to enhance the rotation of the drive shaft 22 in the reverse of the original rotation of the crankshaft 56. The vehicle is accordingly driven in reverse by both the clutch motor 30 and the assist motor 40. The third choice is to make the assist motor 40 carry out the regenerative operation. In this case, the torque produced by the assist motor 40 acts in the direction of canceling the torque produced by the clutch motor 30. This results in decreasing output torque of the drive shaft 22, but the electric power regenerated by the assist motor 40 can cover some of the energy required for the reverse movement of the vehicle and thereby reduce the consumption of electric power stored in the battery 94.

Although the power output apparatus 20 is applied to the control of the second embodiment in the above description, the second embodiment is not restricted to this structure. For example, the assist motor is not an essential constituent in the process of moving the vehicle back by the clutch motor 30, as long as the power output apparatus includes the clutch motor 30, the gasoline engine 50, and the battery 94.

In the second embodiment, the clutch motor 30 is controlled to rotate the drive shaft 22 in the reverse of the original rotation of the crankshaft 56 while the crankshaft 56 is at a stop. The crankshaft 56 may, however, be rotated during the control process. The clutch motor 30 can rotate the drive shaft 22 in the reverse of the original rotation of the crankshaft 56 as long as the crankshaft 56 receives the torque having the magnitude equal to or greater than the torque Tc produced by the clutch motor 30 but acting in the reverse of the torque Tc. It thus makes no difference whether the crankshaft 56 is rotating or not.

When the clutch motor 30 rotates the drive shaft 22 in the reverse of the original rotation of the crankshaft 56 while the crankshaft 56 is rotating, the crankshaft 56 receives a kinetic friction torque of the crankshaft 56 of the gasoline engine 50, which acts in the reverse of the torque Tc of the clutch motor 30 and balances the torque Tc. Under such conditions, it makes no difference whether the gasoline engine 50 is driven or not driven, since the gasoline engine 50 falls in a state similar to braking. The kinetic friction torque of the crankshaft 56 includes not only a torque produced by the actual friction but torques due to the resistivity produced in the process of compressing the air in a cylinder with a piston in the gasoline engine 50 or the resistivity produced in the process of ingesting the air into the cylinder. When the gasoline engine 50 has the function of exhaust brake, a large torque can be produced through the operation of the exhaust brake.

The power output apparatus 20 of the first embodiment can go into still another application given as a third embodiment of the present invention. In order to reduce the speed of the vehicle moving in reverse, that is, in order to brake the drive shaft 22 rotating in the reverse of the rotation of the crankshaft 56 of the gasoline engine 50, either the assist motor 40 or the clutch motor 30 is required to carry out the regenerative operation and realize regenerative braking. When the residual capacity BRM of the battery 94 is equal to or greater than a reference maximum level Bmax, the battery 94 is in fully-charged state and can not store any additional electric power. This means that the battery 94 can not absorb the electric power regenerated by either the assist motor 40 or the clutch motor 30. Non-absorption of the regenerated power leads to no reduction of the speed of the vehicle moving in reverse. In the third embodiment, the assist motor 40 is controlled to carry out the regenerative operation and apply a regenerative braking force to the drive shaft 22 under the non-operating condition of the gasoline engine 50, while the electric power regenerated by the assist motor 40 is supplied to the clutch motor 30, which subsequently carries out the power operation with the regenerated power.

Figure 15:
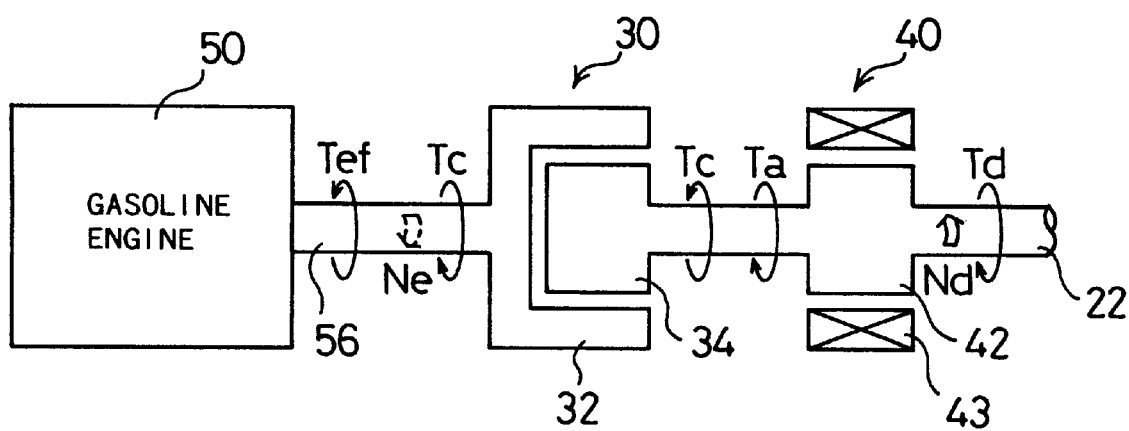
FIG. 15 shows torques applied onto the respective shafts of the power output apparatus in the third embodiment.

FIG. 15 shows torques applied onto the respective shafts of the power output apparatus in the third embodiment. In the structure of the third embodiment, the gasoline engine 50 has stopped operation and the crankshaft 56, which originally rotates in the direction of the open arrow of the one-dot chain line, has stopped rotating (engine speed Ne=0). The drive shaft 22 is rotated in the reverse of the original rotation of the crankshaft 56 as shown by the open arrow of the solid line in FIG. 15. Under the condition that the assist motor 40 implements the regenerative operation and that the clutch motor 30 implements the power operation, the following torques are applied to the crankshaft 56 and the drive shaft 22. Like the second embodiment shown in FIG. 13, the crankshaft 56 receives the torque Tc produced by the clutch motor 30 and the static friction torque Tef of the crankshaft 56, which act in the opposite directions and balance each other. The drive shaft 22 receives the torque Tc produced by the clutch motor 30 and the torque Ta produced by the assist motor 40. The torque Tc acts in the direction of enhancing the rotation of the drive shaft 22, whereas the torque Ta acts in the direction of braking the rotation of the drive shaft 22. The torque Tc of the clutch motor 30 is thus opposite in direction to the torque Ta of the assist motor 40. The torque Tc of the clutch motor 30 applied to the crankshaft 56 is a reaction of the torque Tc applied to the drive shaft 22. The explanation does not take into account the friction torque of the drive shaft 22.

Energy Pa regenerated as electric power by the assist motor 40 is expressed as:

$$Pa = Ksa \times Ta \times Nd \tag{9}$$

wherein Ksa denotes an efficiency of regenerative operation in the assist motor 40 and Nd represents the revolving speed of the drive shaft 22.

Energy Pc consumed by the clutch motor 30 is given as:

$$Pc = (1/ksc) \times Tc \times Nc \tag{10}$$

wherein ksc denotes an efficiency of power operation in the clutch motor 30 and Nc represents the revolving speed of the clutch motor 30 (that is, the revolving speed difference between the crankshaft 56 and the drive shaft 22).

There is a certain amount of energy loss in the process of transmitting the energy regenerated as electric power by the assist motor 40 to the clutch motor 30. The energy Pa produced by the assist motor 40 is accordingly greater than the energy Pc consumed by the clutch motor 30:

$$Pa > Pc \tag{11}$$

Since the crankshaft 56 has stopped rotation, the revolving speed Nc of the clutch motor 30 is equal to the revolving speed Nd of the drive shaft 22. Substituting Equations (9) and (10) in Expression (11) yields:

$$Ksa \times Ta > (1/ksc) \times Tc \tag{12}$$

On the assumption that both the efficiency of regenerative operation Ksa in the assist motor 40 and the efficiency of power operation ksc in the clutch motor 30 are closed to the value '1', Expression (12) is further rewritten as:

$$Ta > Tc \tag{13}$$

As clearly shown in FIG. 15, the output torque Td of the drive shaft 22 is equal to Ta−Tc. Expression (13) is thus further changed to:

$$Td = Ta - Tc > 0 \tag{14}$$

Expression (14) shows that the output torque Td acts in the reverse of the rotation of the drive shaft 22 to brake the drive shaft 22. Namely the drive shaft 22 receives a deceleration (that is, an acceleration in the reverse of the rotation of the drive shaft 22), which reduces the speed of the vehicle moving in reverse.

As discussed above in the second embodiment, the condition of Expression (5) should be satisfied to prevent the clutch motor 30 from rotating the crankshaft 56 of the gasoline engine 50.

Figure 16:
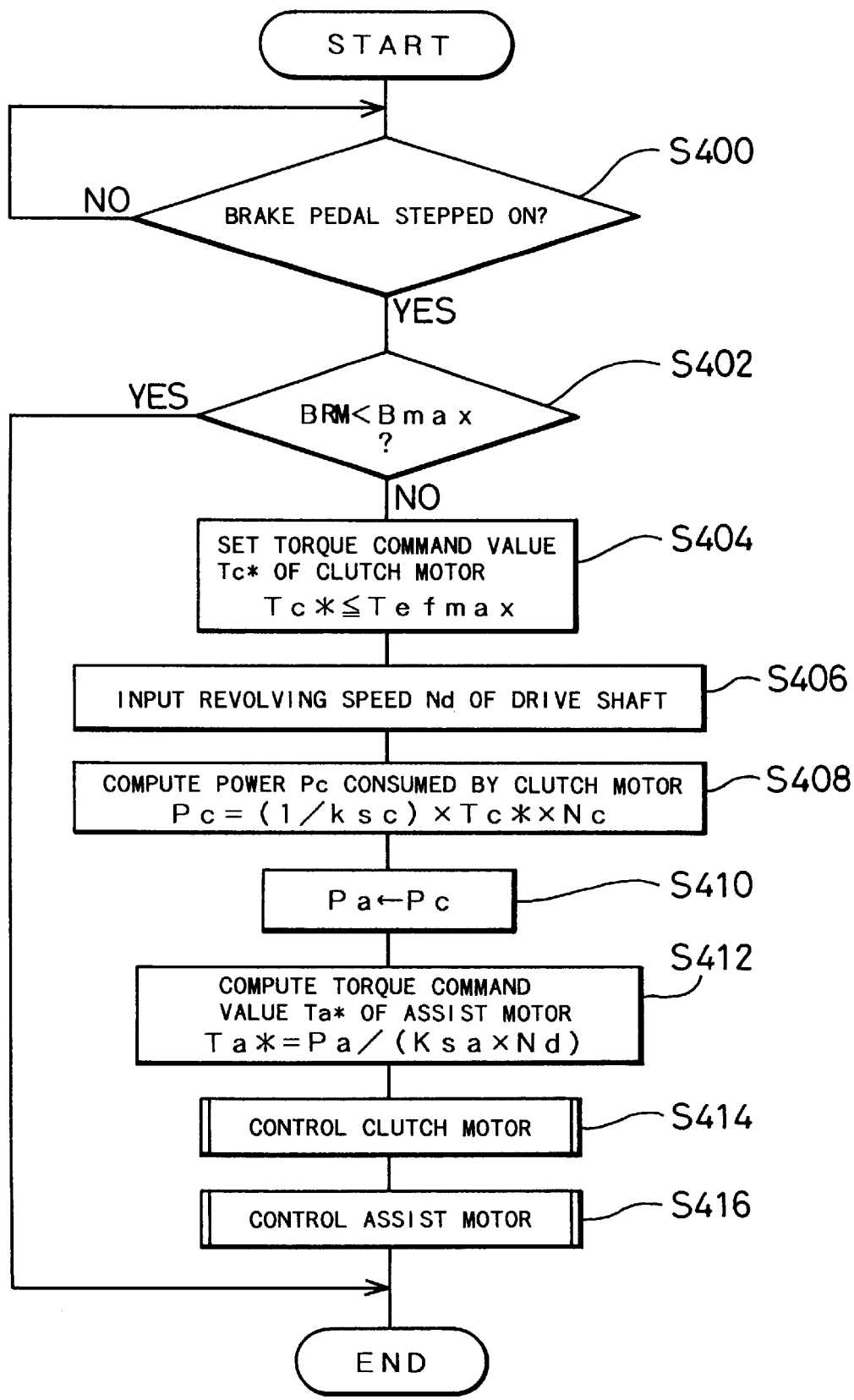
FIG. 16 is a flowchart showing a control process of the third embodiment executed by the control CPU 90 to reduce the speed of the vehicle moving in reverse.

FIG. 16 is a flowchart showing a control process of the third embodiment executed by the control CPU 90 to reduce the speed of the vehicle moving in reverse. This control routine is executed on the premise that the vehicle moves in reverse (that is, the drive shaft 22 rotates in the reverse of the rotation of the crankshaft 56), the gasoline engine 50 has stopped its operation, and the crankshaft 56 has stopped its rotation. When the program enters the routine of FIG. 16, the control CPU 90 first determines whether a brake pedal (not shown) has been stepped on at step S400. The driver generally steps on the brake pedal when desiring to reduce the speed of the vehicle or to stop the vehicle. In response to a step-on operation of the brake pedal, the program determines that the driver requires reducing the speed of the vehicle and executes the reduction process as described below.

The control CPU 90 receives the output of the residual capacity meter 99 and compares the residual capacity BRM of the battery 94 with a reference maximum level Bmax at step S402. When the residual capacity BRM of the battery 94 is less than the reference maximum level Bmax, the program determines that the battery 94 still has a marginal capacity to store additional electric power and exits from the routine of FIG. 16. In this case, another reduction process is carried out by utilizing the battery 94. For example, the clutch motor 30 or the assist motor 40 is controlled to implement the regenerative operation and realize regenerative braking, while the regenerated power is stored in the battery 94. When the residual capacity BRM of the battery 94 is equal to or greater than the reference maximum level Bmax, on the contrary, the program determines that the battery 94 is in fully-charged state and can not store any additional electric power and proceeds to step S404.

Based on the maximum static friction torque Tefmax of the crankshaft 56 of the gasoline engine 50, the torque command value Tc* of the clutch motor 30 is determined to satisfy the condition of Expression (5) at step S404. The control CPU 90 then receives data of revolving speed Nd of the drive shaft 22 at step S406. Since the crankshaft 56 of the gasoline engine 50 is at a stop as previously mentioned, the revolving speed Nc of the clutch motor 30 is equal to the revolving speed Nd of the drive shaft 22. At step S406, the control CPU 90 thus receives data of revolving speed Nc of the clutch motor 30 as well as revolving speed Nd of the drive shaft 22.

At subsequent step S408, the control CPU 90 calculates the electric power Pc consumed by the clutch motor 30 from the torque command value Tc* of the clutch motor 30 set at step S404 and the revolving speed Nc of the clutch motor 30 input at step S406 according to Equation (10) given above. The electric power Pa to be regenerated by the assist motor 40 is led from the consumed power Pc by taking into account the energy loss in the process of transmission at step S410. The control CPU 90 computes the torque command value Ta* of the assist motor 40 from the revolving speed Nd of the drive shaft 22 read at step S406 and the regenerated power Pa led at step S410 according to Equation (9) given above at step S412.

At step S414, the control CPU 90 controls the clutch motor 30 based on the torque command value Tc* of the clutch motor 30 set at step S404. The concrete procedure of the clutch motor control is identical with that described above according to the flowchart of FIG. 7. At subsequent step S416, the control CPU 90 controls the assist motor 40 based on the torque command value Ta* of the assist motor 40 set at step S412. The concrete procedure of the assist motor control is similar to the processing of step S140 and subsequent steps in the flowcharts of FIGS. 8 and 9. In the flowchart of FIG. 16, as a matter of convenience of illustration, the control operations of the clutch motor 30 and the assist motor 40 are shown as separate steps. In the actual procedure, however, these control operations are carried out comprehensively. For example, the control CPU 90 simultaneously controls the clutch motor 30 and the assist motor 40 by interrupt processing.

The control process discussed above enables the assist motor 40 to carry out the regenerative operation and apply a regenerative braking force to the drive shaft 22, while enabling the clutch motor 30 to carry out the power operation and consume the electric power regenerated by the assist motor 40. The structure of the third embodiment can brake the drive shaft 22 and reduce the speed of the vehicle moving in reverse whereas allowing the clutch motor 30 to absorb the electric power regenerated by the assist motor 40.

The magnitude of the output torque Td is varied by controlling the operating conditions of the clutch motor 30 and the assist motor 40 to change the amount of energy loss in the respective motors 30 and 40 (for example, by varying the efficiency of regenerative operation Ksa in the assist motor 40 and the efficiency of power operation ksc in the clutch motor 30).

Like the second embodiment, the control process of the third embodiment is executed while the crankshaft 56 is at a stop. The crankshaft 56 may, however, be rotated during the process of braking the drive shaft 22 and reducing the vehicle speed.

Figure 17:
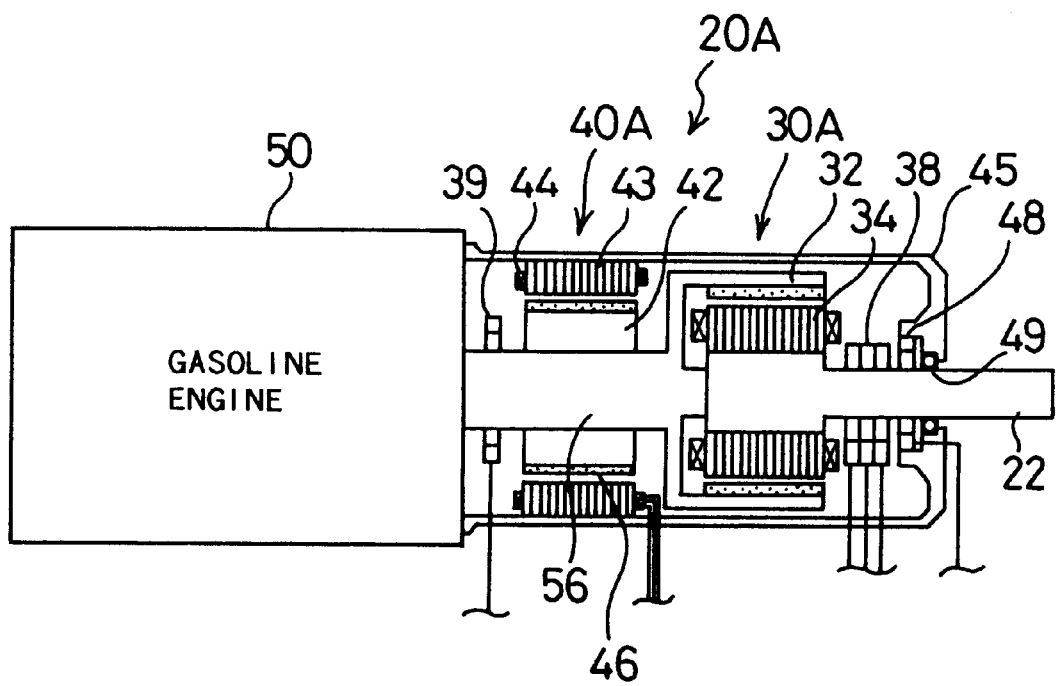
FIG. 17 schematically illustrates an essential part of another power output apparatus 20A as a fourth embodiment of the present invention.

FIG. 17 schematically illustrates an essential part of another power output apparatus 20A as a fourth embodiment of the present invention. Although the assist motor 40 is attached to the drive shaft 22 in the power output apparatus 20 of FIG. 1, an assist motor 40A is attached to the crankshaft 56 of the gasoline engine 50 in the power output apparatus 20A of FIG. 17.

The power output apparatus 20A of FIG. 17 has a similar structure to that of the power output apparatus 20 of FIG. 1, except that the assist motor 40A is attached to the crankshaft 56 placed between the gasoline engine 50 and a clutch motor 30A. In the power output apparatus 20A of FIG. 17, like numerals and symbols denote like elements as those of the power output apparatus 20 of FIG. 1. The symbols used in the description have like meanings unless otherwise specified.

The following describes the essential operation of the power output apparatus 20A shown in FIG. 17. Described first is the operation of the fourth embodiment carried out to drive the vehicle forward, that is, to rotate the drive shaft 22 in the direction of rotation of the crankshaft 56 of the gasoline engine 50. By way of example, it is assumed that the gasoline engine 50 is driven with a torque Te and at a revolving speed Ne. When a torque Ta is added to the crankshaft 56 by the assist motor 40A linked with the crankshaft 56, the sum of the torques (Te+Ta) consequently acts on the crankshaft 56. When the clutch motor 30A is controlled to produce the torque Tc equal to the sum of the torques (Te+Ta), the torque Tc (=Te+Ta) is transmitted to the drive shaft 22.

When the revolving speed Nd of the drive shaft 22 is lower than the revolving speed Ne of the gasoline engine 50 (Nd<Ne), the clutch motor 30A regenerates electric power based on the revolving speed difference Nc between the revolving speed Ne of the gasoline engine 50 and the revolving speed Nd of the drive shaft 22. The regenerated power is supplied to the assist motor 40A via the first and the second driving circuits 91 and 92 to activate the assist motor 40A. Provided that the torque Ta of the assist motor 40A is set to a value, which enables the assist motor 40A to consume the electrical energy substantially equivalent to the electrical energy regenerated by the clutch motor 30A, free torque conversion is allowed for the energy output from the gasoline engine 50 within a range holding the relationship of Equation (15) given below. Since the relationship of Equation (15) represents the ideal state with an efficiency of 100%, (Tc×Nd) is a little smaller than (Te×Ne) in the actual state.

$$Te \times Ne = Tc \times Nd \tag{15}$$

When the revolving speed Nd of the drive shaft 22 is higher than the revolving speed Ne of the gasoline engine 50 (Nd>Ne), the clutch motor 30A works as a normal motor. The clutch motor 30A accordingly enhances the speed of rotation of the inner rotor 34 relative to the outer rotor 32. Provided that the torque Ta of the assist motor 40A is set to a negative value, which enables the assist motor 40A to regenerate the electrical energy substantially equivalent to the electrical energy consumed by the clutch motor 30A, free torque conversion is also allowed for the energy output from the gasoline engine 50 within a range holding the relationship of Equation (15) given above.

The following describes the operation of the fourth embodiment carried out to drive the vehicle in reverse, that is, to rotate the drive shaft 22 in the reverse of the rotation of the crankshaft 56 of the gasoline engine 50. Any of the following four control processes may be applied in this embodiment to move the vehicle back.

In accordance with a first control process, the control CPU 90 sends an instruction to the EFIECU 70 through communication. The EFIECU 70 receiving the instruction controls the gasoline engine 50 to stop the operation of the gasoline engine 50 and the rotation of the crankshaft 56. The control CPU 90 then controls the second driving circuit 92 to fix the crankshaft 56 via the electromagnetic coupling of the stator 43 with the rotor 42 in the assist motor 40A. This is realized by enabling the three-phase coils 44 to generate not a rotating magnetic field but a stationary magnetic field. The control CPU 90 subsequently controls the first driving circuit 91 to enable the clutch motor 30A to carry out the power operation and rotate the drive shaft 22 in the reverse of the original rotation of the crankshaft 56. The electric power stored in the battery 94 is used to drive the assist motor 40A and the clutch motor 30A.

Figure 18:
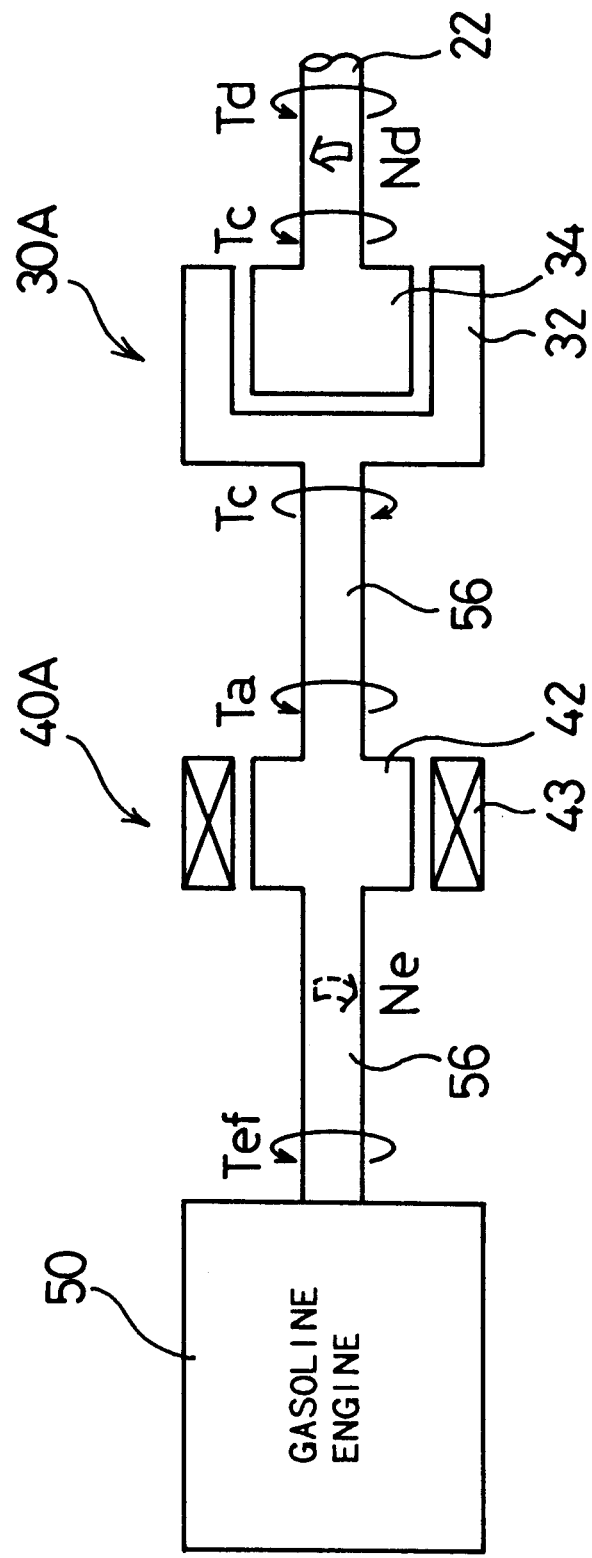
FIG. 18 shows torques applied onto the respective shafts of the power output apparatus 20A of FIG. 17.

FIG. 18 shows torques applied onto the respective shafts in the power output apparatus 20A of FIG. 17. When the clutch motor 30A rotates the drive shaft 22 in the reverse of the original rotation of the crankshaft 56 (shown by the open arrow of the one-dot chain line) as shown by the open arrow of the solid line, the crankshaft 56 receives the torque Tc produced by the clutch motor 30A. The torque Tc of the clutch motor 30A acts in the direction of original rotation of the crankshaft 56 and is opposite in direction to the torque Ta produced by the assist motor 40A. This prevents the crankshaft 56 from rotating. The drive shaft 22 can thus continue rotating in the reverse of the original rotation of the crankshaft 56 with the support of the stationary crankshaft 56. Under the practical condition, the crankshaft 56 also receives the static friction torque Tef of the crankshaft 56 produced by the gasoline engine 50. The sum of the static friction torque Tef and the torque Ta of the assist motor 40A accordingly balances the torque Tc of the clutch motor 30A.

When the electromagnetic coupling of the stator 43 with the rotor 42 is released in the assist motor 40A, only the static friction torque Tef of the crankshaft 56 in the gasoline engine 50 works to fix the crankshaft 56. Under such conditions, the power output apparatus 20A falls in the state identical with that described in the second embodiment.

In accordance with a second control process, the control CPU 90 controls the second driving circuit 92 to enable the assist motor 40A to carry out the regenerative operation while the gasoline engine 50 is in operating state and the crankshaft 56 is rotated. The control CPU 90 subsequently controls the first driving circuit 91 to enable the clutch motor 30A to carry out the power operation with the electric power regenerated by the assist motor 40A and rotate the drive shaft 22 in the reverse of the rotation of the crankshaft 56. In the second process, the electric power stored in the battery 94 is not used for the control procedure.

Figure 19:
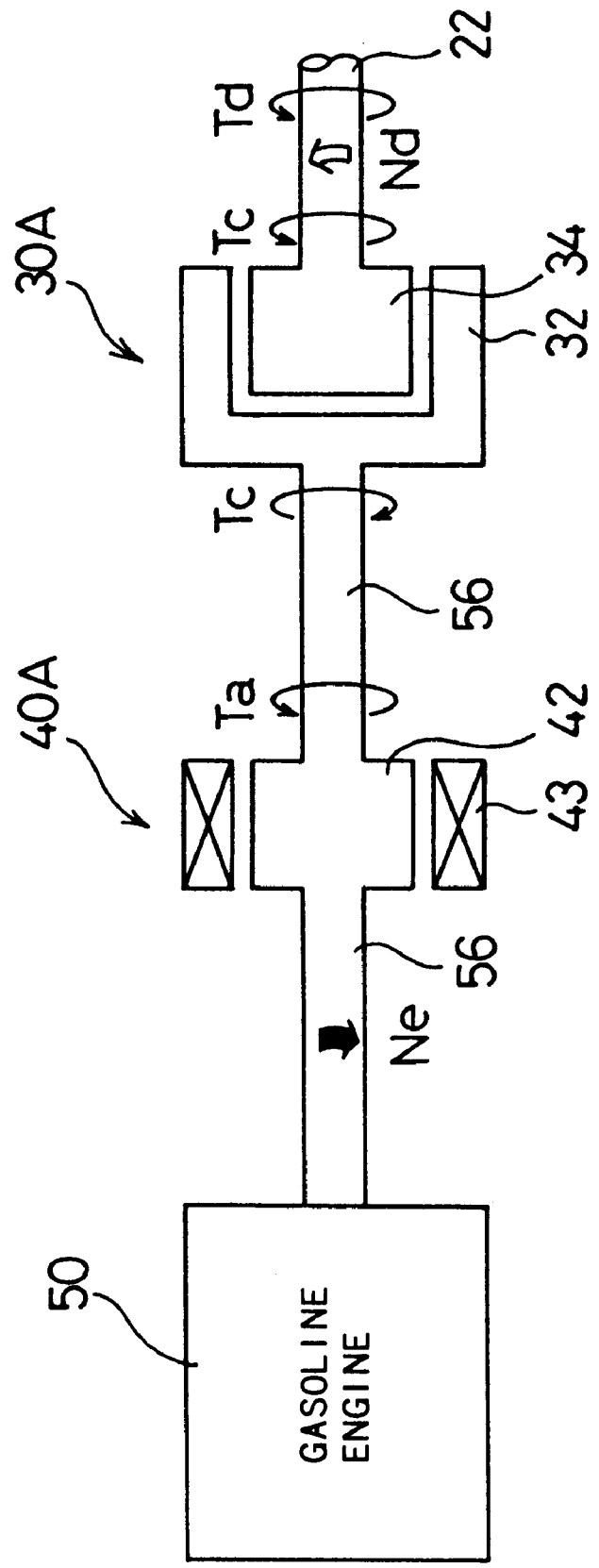
FIG. 19 also shows torques applied onto the respective shafts in the power output apparatus 20A of FIG. 17.

FIG. 19 also shows torques applied onto the respective shafts in the power output apparatus 20A of FIG. 17. When the assist motor 40A is controlled to implement the regenerative operation while the crankshaft 56 rotates in the direction of the closed arrow, the crankshaft 56 receives the regenerative torque Ta produced by the assist motor 40A. In the meanwhile, the clutch motor 30A carries out the power operation and applies the torque Tc onto the crankshaft 56, which acts in the direction of rotation of the crankshaft 56 and balances the torque Ta (provided that the crankshaft 56 is rotated at a constant speed). According to the law of action and reaction, the clutch motor 30A also applies the torque Tc onto the drive shaft 22, which acts in the reverse of the rotation of the crankshaft 56. This torque Tc is output as the output torque Td from the drive shaft 22.

Figure 20:
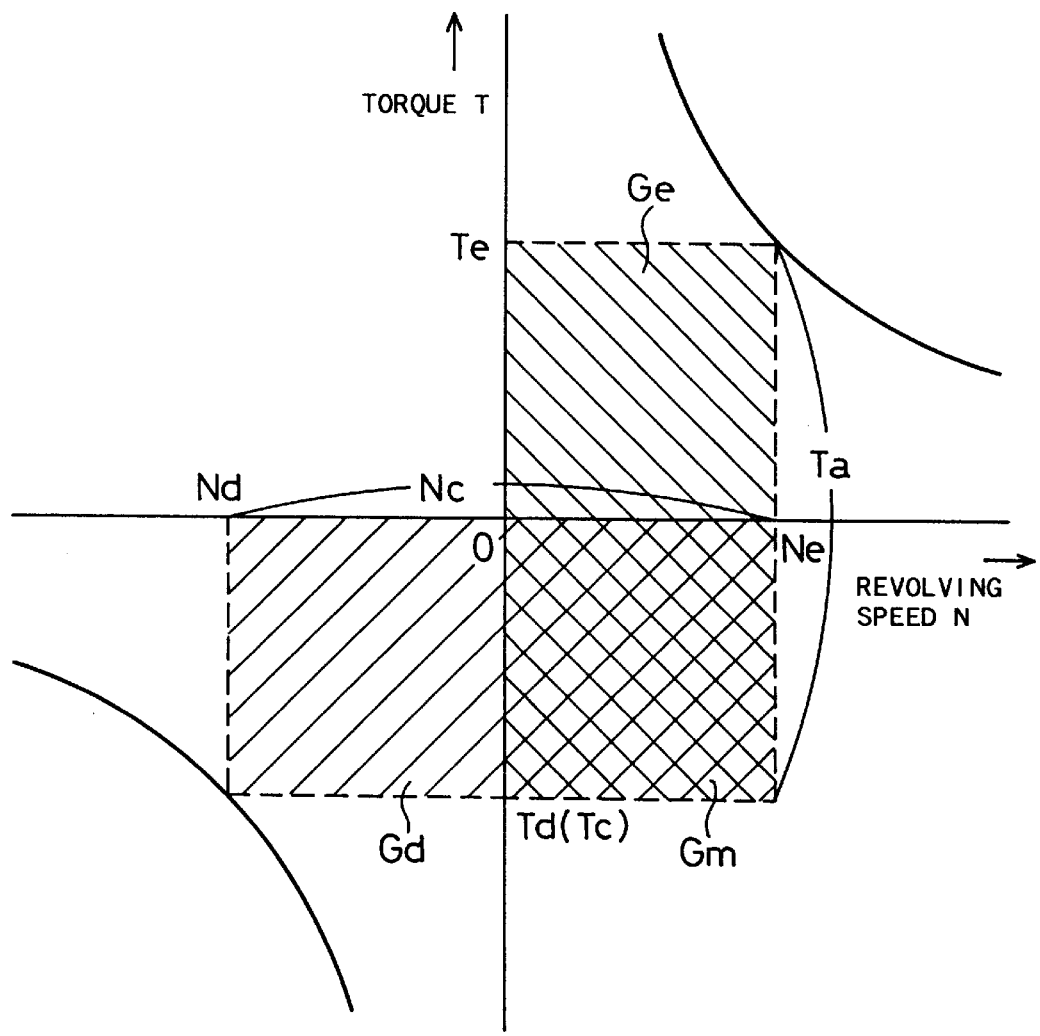
FIG. 20 is a graph schematically illustrating an amount of energy regenerated by the assist motor 40A and that consumed by the clutch motor 30A under the condition of FIG. 19.

FIG. 20 is a graph schematically illustrating an amount of energy regenerated by the assist motor 40A and that consumed by the clutch motor 30A under the condition of FIG. 19. As clearly shown in FIG. 20, the gasoline engine 50 rotating at an engine speed Ne and an engine torque Te produces energy corresponding to a region Ge. The assist motor 40A regenerates energy corresponding to the sum of regions Ge+Gm as electric power. The regenerated power is supplied to the clutch motor 30A, which consumes energy corresponding to the sum of regions Gd+Gm and rotates the drive shaft 22 at a revolving speed Nd in the reverse of the rotation of the crankshaft 56. This means that the energy in the region Ge is converted to that in the region Gd. The drive shaft 22 consequently outputs the torque difference (Te−Ta) as the output torque Td, that is, the drive shaft 22 outputs the energy in the region Ge.

There is a certain amount of energy loss in the process of regenerating electric power in the assist motor 40A, transmitting the regenerated power to the clutch motor 30A, and consuming the transmitted power in the clutch motor 30A. It is accordingly rare that the energy in the region Ge perfectly coincides with the energy in the region Gd in the practical operation, although the energy loss in the clutch motor 30A and the assist motor 40A is relatively small.

Figure 21:
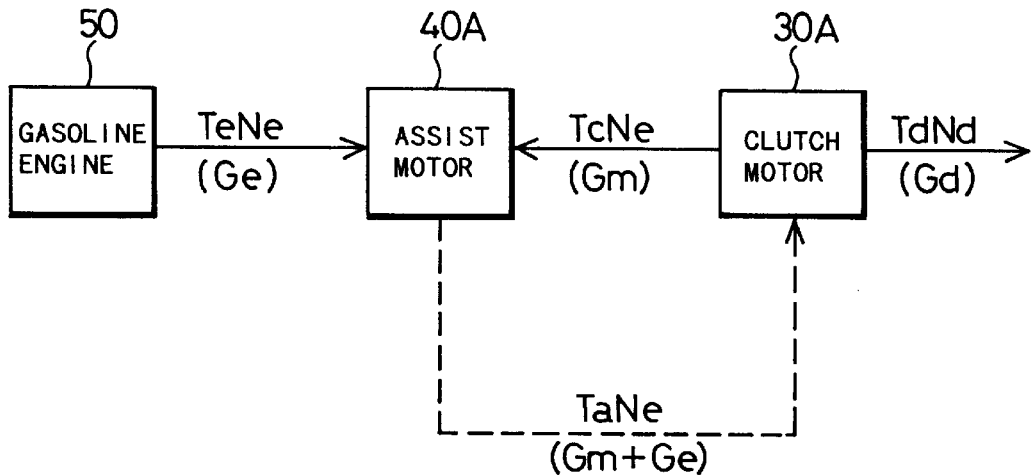
FIG. 21 shows a flow of energy between the gasoline engine 50, the clutch motor 30A, and the assist motor 40A.

FIG. 21 shows a flow of energy between the gasoline engine 50, the clutch motor 30A, and the assist motor 40A. The assist motor 40A receives mechanical energy Te×Ne in the region Ge produced by the gasoline engine 50 and mechanical energy Tc×Ne in the region Gm transmitted from the clutch motor 30A. The assist motor 40A converts the total mechanical energy to electrical energy Ta×Na corresponding to the sum of the regions Gm+Ge. The converted electrical energy is supplied to the clutch motor 30A. The clutch motor 30A then converts the electrical energy supplied from the assist motor 40A to mechanical energy Tc×Nc corresponding to the sum of the regions Gm+Gd. Part of the mechanical energy Tc×Ne corresponding to the region Gm is transmitted to the assist motor 40A, whereas the residual mechanical energy Td×Nd corresponding to the region Gd is output from the drive shaft 22.

In accordance with a third control process, like the second control process, the control CPU 90 activates the regenerative operation of the assist motor 40A and the power operation of the clutch motor 30A. In this process, the electric power regenerated by the assist motor 40A is not fully transmitted to the clutch motor 30A but partly supplied to the battery 94. This process allows the battery 94 to be charged with the regenerated power while rotating the drive shaft 22 in the reverse of the rotation of the crankshaft 56.

In accordance with a fourth control process, like the second control process, the control CPU 90 activates the regenerative operation of the assist motor 40A and the power operation of the clutch motor 30A. In this process, the clutch motor 30A carries out the power operation with not only the electric power regenerated by the assist motor 40A but with the electric power stored in the battery 94. This process allows a large torque to be output to the drive shaft 22 rotating in the reverse of the rotation of the crankshaft 56.

The power output apparatus 20A having the structure shown in FIG. 17 can rotate the drive shaft 22 in the reverse of the rotation of the crankshaft 56 according to any of the above four control process.

There may be many other modifications, alternations, and changes without departing from the scope or spirit of essential characteristics of the invention. It is thus clearly understood that the above embodiments are only illustrative and not restrictive in any sense. Some examples of modification are given below.

In the structure of the power output apparatus 20 shown in FIG. 1, the clutch motor 30 and the assist motor 40 are separately attached to the different positions of the drive shaft 22. Like a modified power output apparatus 20B illustrated in FIG. 22, however, the clutch motor and the assist motor may integrally be joined with each other. A clutch motor 30B of the power output apparatus 20B includes an inner rotor 34 connecting with the crankshaft 56 and an outer rotor 32B linked with the drive shaft 22. Three-phase coils 36 are attached to the inner rotor 34, and permanent magnets 35B are set on the outer rotor 32B in such a manner that the outer surface and the inner surface thereof have different magnetic poles. An assist motor 40B includes the outer rotor 32B of the clutch motor 30B and a stator 43 with three-phase coils 44 mounted thereon. In this structure, the outer rotor 32B of the clutch motor 30B also works as a rotor of the assist motor 40B. Since the three-phase coils 36 are mounted on the inner rotor 34 connecting with the crankshaft 56, a rotary transformer 38 for supplying electric power to the three-phase coils 36 of the clutch motor 30B is attached to the crankshaft 56.

In the power output apparatus 20B, the voltage applied to the three-phase coils 36 on the inner rotor 34 is controlled against the inner-surface magnetic pole of the permanent magnets 35B set on the outer rotor 32B. This allows the clutch motor 30B to work in the same manner as the clutch motor 30 of the power output apparatus 20 shown in FIG. 1. The voltage applied to the three-phase coils 44 on the stator 43 is controlled against the outer-surface magnetic pole of the permanent magnets 35B set on the outer rotor 32B. This allows the assist motor 40B to work in the same manner as the assist motor 40 of the power output apparatus 20. The control procedures discussed as the first through the third embodiments above are applicable to the power output apparatus 20B shown in FIG. 22, which accordingly exerts the same effects as those of the power output apparatus 20 shown in FIG. 1.

Figure 22:
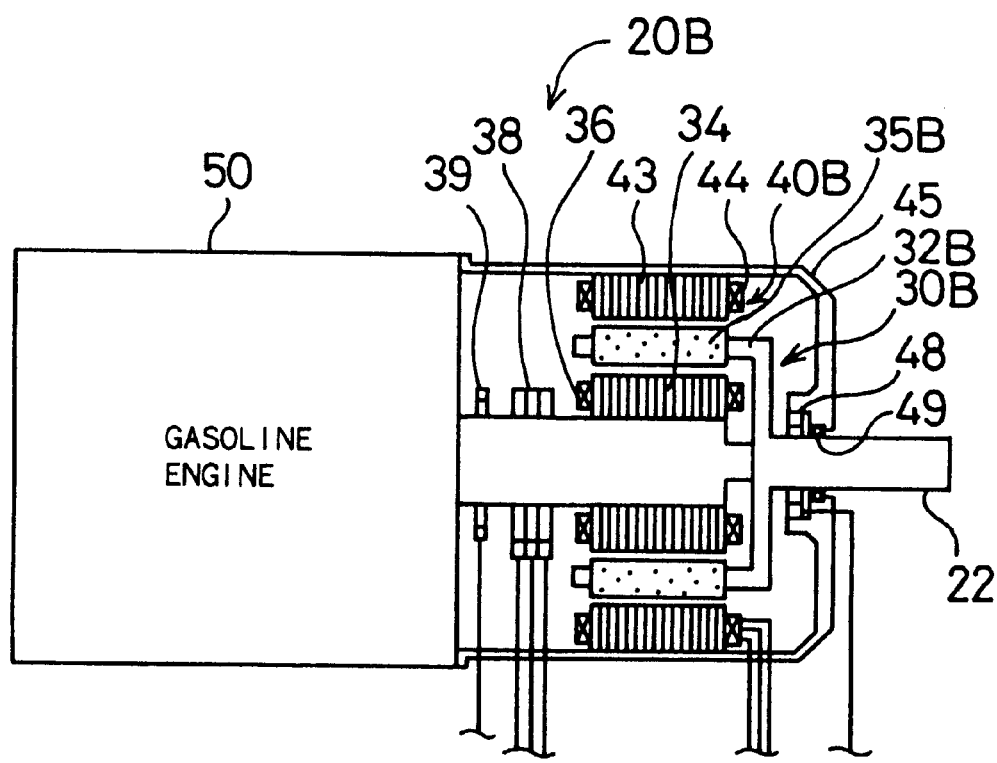
FIG. 22 is a schematic view illustrating an essential part of a power output apparatus 20B as a modification of the invention.

In the power output apparatus 20B of FIG. 22, the clutch motor 30B and the assist motor 40B are integrally joined with each other, which shortens the length of the power output apparatus 20B along the drive shaft 22. The outer rotor 32B functions concurrently as one of the rotors in the clutch motor 30B and as the rotor of the assist motor 40B, thereby effectively reducing the size and weight of the whole power output apparatus 20B.

The modified structure that the outer rotor 32B works as one of the rotors in the clutch motor 30B and as the rotor of the assist motor 40B causes the clutch motor 30B and the assist motor 40B to magnetically interfere with each other and thereby have adverse effects on each other. In order to prevent the large magnetic interference, the outer rotor 32B may be constructed as a double-cylinder structure including two concentric cylinders. One of the cylinders is assigned to the rotor of the clutch motor 30B, and the other to the rotor of the assist motor 40B. The two cylinders apart from each other by a predetermined distance are connected to the drive shaft 22. A magnetic shielding member for blocking the magnetic lines of force is also effective for preventing the magnetic interference.

Figure 23:
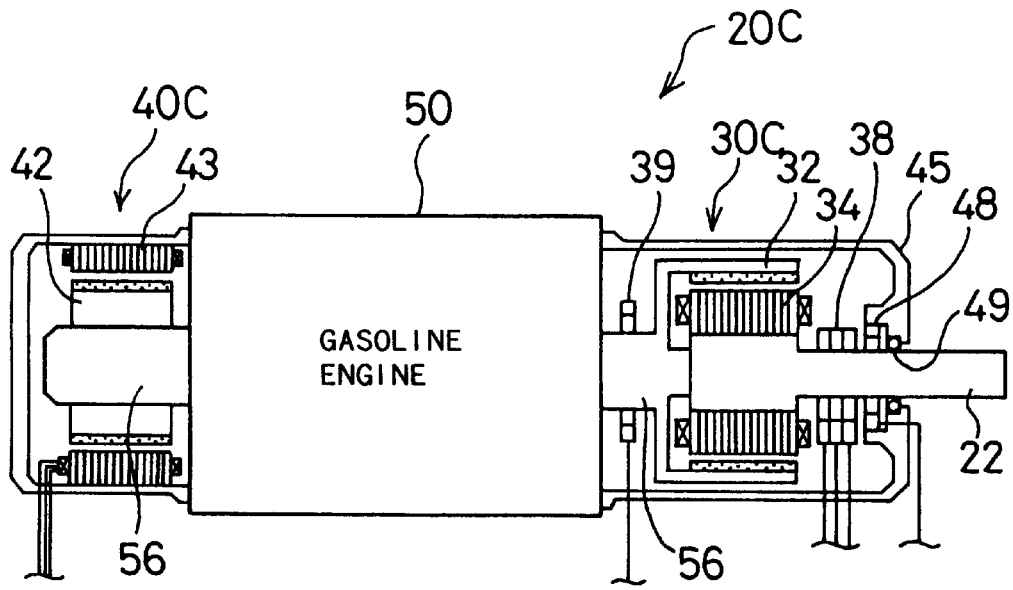
FIG. 23 is a schematic view illustrating an essential part of another power output apparatus 20C as still another modification of the invention.

In the power output apparatus 20A of FIG. 17 given as the fourth embodiment discussed above, the assist motor 40A is attached to the crankshaft 56 placed between the gasoline engine 50 and the clutch motor 30A. Like another power output apparatus 20C illustrated in FIG. 23, however, the gasoline engine 50 may be interposed between a clutch motor 30C and an assist motor 40C, both of which are linked with the crankshaft 56. The control procedures executed by the power output apparatus 20A of FIG. 17 are also applicable to the power output apparatus 20C, which accordingly implements the similar operations and exerts the similar effects.

In the power output apparatus 20A of FIG. 17, the clutch motor 30A and the assist motor 40A are separately attached to the different positions of the crankshaft 56. Like a power output apparatus 20D shown in FIG. 24, however, the clutch motor and the assist motor may integrally be joined with each other. A clutch motor 30D of the power output apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. An assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power output apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30A of the power output apparatus 20A shown in FIG. 17. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40A of the power output apparatus 20A. The control procedures of the fourth embodiment discussed above are also applicable to the power output apparatus 20D shown in FIG. 24, which accordingly exerts the same effects as those of the power output apparatus 20A shown in FIG. 17.

Figure 24:
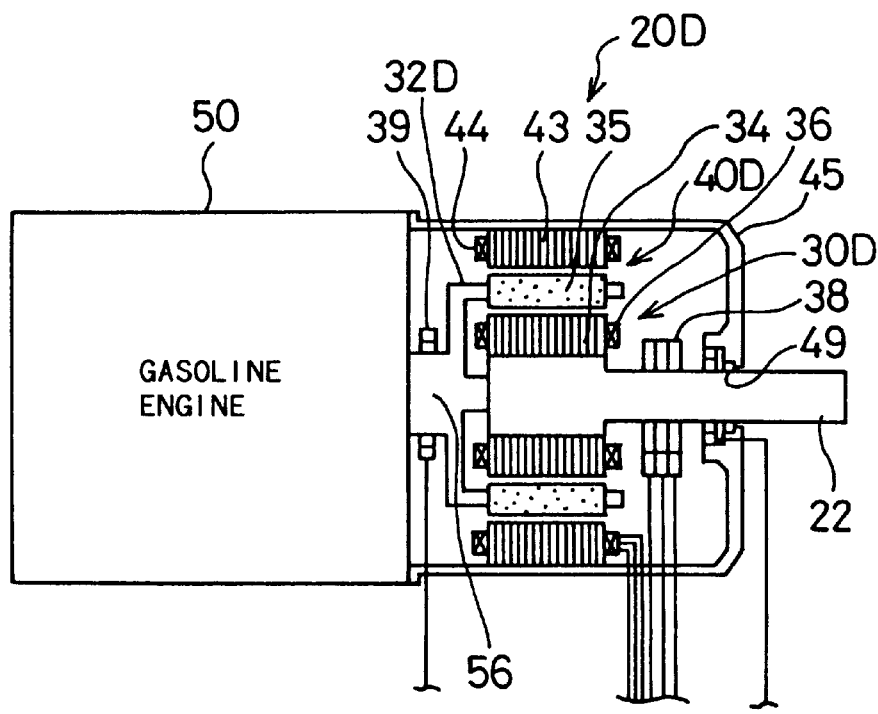
FIG. 24 is a schematic view illustrating an essential part of still another power output apparatus 20D as another modification of the invention.

Like the power output apparatus 20B shown in FIG. 22, in the power output apparatus 20D of FIG. 24, the clutch motor 30D and the assist motor 40D are integrally joined with each other, which shortens the length of the power output apparatus 20D along the drive shaft 22. The outer rotor 32D functions concurrently as one of the rotors in the clutch motor 30D and as the rotor of the assist motor 40D, thereby effectively reducing the size and weight of the whole power output apparatus 20D.

Figure 25:
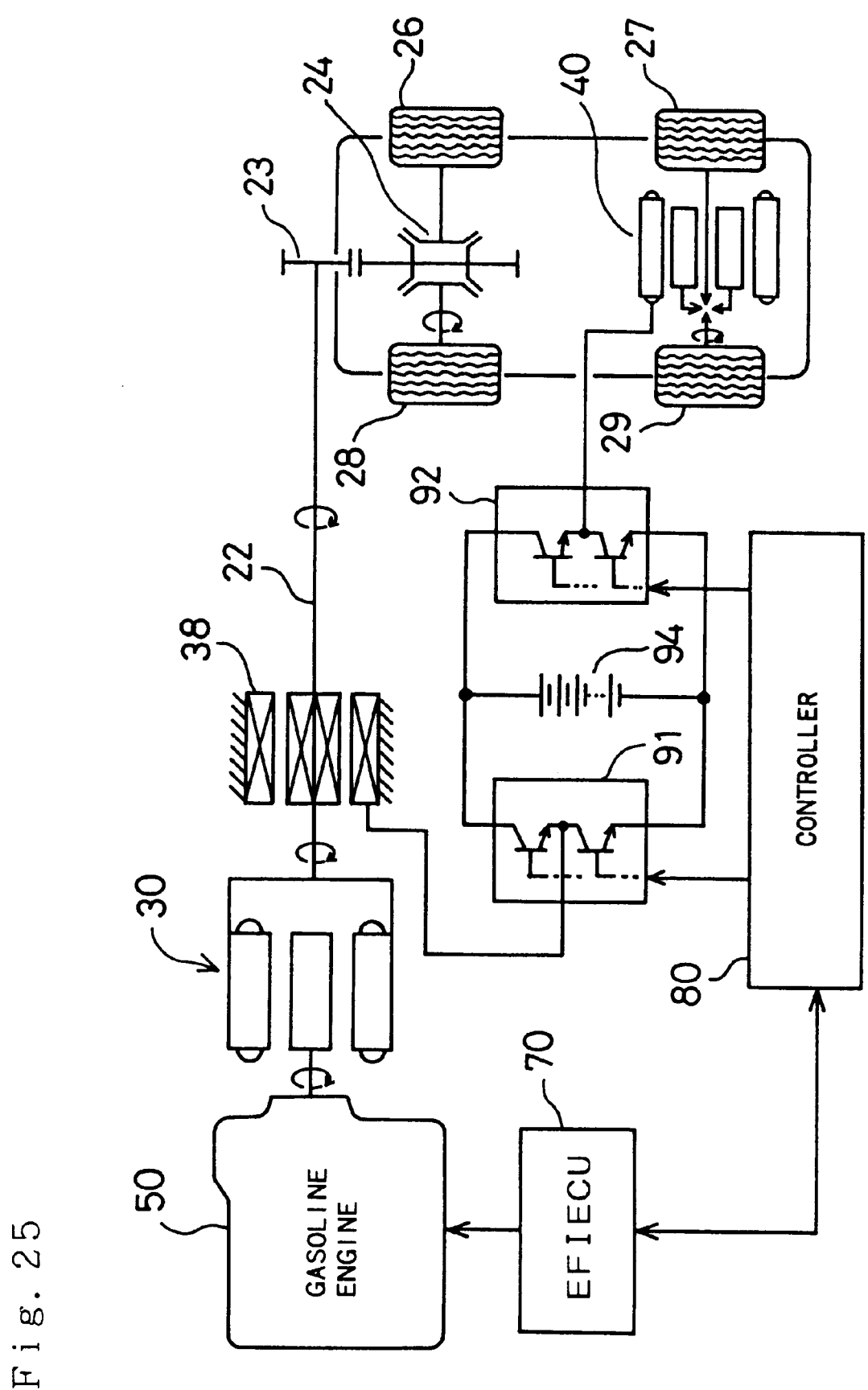
FIG. 25 shows application of the power output apparatus 20 of FIG. 1 to a vehicle with a four-wheel drive.

The power output apparatus 20 of FIG. 1 is also applicable to the vehicle with a four-wheel drive (4WD) as shown in FIG. 25. In the structure of FIG. 25, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28.

The control procedures of the first through the third embodiments discussed above can also be realized by this modified structure. In the first embodiment, when the battery 94 has a sufficient residual capacity, the clutch motor 30 is controlled to have substantially zero torque, and the assist motor 40 is then controlled to carry out the reverse power operation with the electric power stored in the battery 94. When the battery 94 does not have a sufficient residual capacity, on the contrary, the clutch motor 30 regenerates electric power via the rotations of the front driving wheels 26 and 28. The assist motor 40 is controlled to implement the reverse power operation with the regenerated power, thereby rotating the rear driving wheels 27 and 29 in the reverse direction and driving the vehicle back.

In the second embodiment, the clutch motor 30 is controlled to implement the power operation with the electric power stored in the battery 94, thereby rotating the front driving wheels 26 and 28 in the reverse direction and driving the vehicle back.

In the third embodiment, when the battery 94 is in fully charged state, the assist motor 40 disposed in the rear-wheel portion is controlled to carry out the regenerative operation and realize regenerative braking. The clutch motor 30 is controlled to implement the power operation and absorb the electric power regenerated by the assist motor 40.

The gasoline engine 50 driven by means of gasoline is used as the engine in the above power output apparatuses. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power output apparatuses described above. Other motors such as variable reluctance (VR)-type synchronous motors, vernier motors, d.c. motors, induction motors, and superconducting motors may be used for both the regenerative operation and power operation, while stepping motors are applicable only for the power operation.

In the power output apparatus described above, the outer rotor 32 of the clutch motor 30 is linked with the crankshaft 56, whereas the inner rotor 34 is connected to the drive shaft 22. Alternatively, the outer rotor 32 may be linked with the drive shaft 22 and the inner rotor 34 with the crankshaft 56. Disk rotors facing each other may be used instead of the outer rotor 32 and the inner rotor 34.

The rotary transformer 38 used as means for transmitting electric power to the clutch motor 30 may be replaced by a slip ring-brush contact, a slip ring-mercury contact, a semiconductor coupling of magnetic energy, or the like.

In the above power output apparatus, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NIMH cells, Li cells, or the like cells. A capacitor may be used in place of the battery 94. The battery 94 also functions as means for absorbing the regenerated power. A variety of electrical equipment (for example, lighting facilities, sound facilities, and cooling facilities) mounted on the vehicle other than the battery 94 may be applied to the means for absorbing the regenerated power.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus comprising:
an output shaft for receiving power from an engine and for being rotated by said engine in a first direction;
a drive shaft, for transmitting power to a load;
a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;
a first motor-driving circuit that exchanges electric currents with said first motor to vary the electromagnetic coupling of said first rotor with said second rotor;
a second motor comprising a stator and a third rotor connected with said drive shaft, said stator being electromagnetically coupled with said third rotor;
a second motor-driving circuit that exchanges electric currents with said second motor to vary the electromagnetic coupling of said stator with said third rotor;
a storage device that stores electric power; and
a controller that sends signals to said first motor-driving circuit and said second motor-driving circuit to control said first motor-driving circuit to enable said first motor to regenerate electric power, and to control said second motor-driving circuit to supply the regenerated electric power and the electric power stored in said storage device to said second motor to drive said second motor to make said drive shaft rotate in a second direction, which is opposite to said first direction.

2. The power output apparatus in accordance with claim 1, further including a residual capacity measuring device that measures a residual capacity of electric power stored in said storage device; and
an engine control device that increases revolving speed of said output shaft to enhance the electric power regenerated by said first motor when said residual capacity is not greater than a predetermined value.

3. The power output apparatus in accordance with claim 1, wherein said third rotor is mounted on said second rotor connected with said drive shaft.

4. A power output apparatus comprising:
an output shaft for receiving power from an engine and for being rotated by said engine in a first direction;
a drive shaft, for transmitting power to a load;
a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;
a first motor-driving circuit that exchanges electric currents with said first motor to vary the electromagnetic coupling of said first rotor with said second rotor;
a second motor comprising a stator and a third rotor connected with said drive shaft, said stator being electromagnetically coupled with said third rotor;
a second motor-driving circuit that exchanges electric currents with said second motor to vary the electromagnetic coupling of said stator with said third rotor;
a storage device that stores electric power; and
a controller that sends signals to said first motor-driving circuit and said second motor-driving circuit to control said first motor-driving circuit to enable said first motor to regenerate electric power, and to control said second motor-driving circuit to supply the regenerated electric power to said second motor and at least partly to said storage device to be stored, and to drive said second motor to make said drive shaft rotate in a second direction, which is opposite to said first direction.

5. The power output apparatus in accordance with claim 4, further including a residual capacity measuring device that measures a residual capacity of electric power stored in said storage device; and
an engine control device that increases revolving speed of said output shaft to enhance the electric power regenerated by said first motor when said residual capacity is not greater than a predetermined value.

6. The power output apparatus in accordance with claim 4, wherein said third rotor is mounted on said second rotor connected with said drive shaft.

7. A power output apparatus comprising:
an output shaft for receiving power from an engine and for being rotated by the engine in a first direction;
a drive shaft for transmitting power to a load;
a motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a motor-driving circuit that exchanges electric currents with said motor to vary the electromagnetic coupling of said first rotor with said second rotor;

a storage device that stores electric power; and a controller that sends signals to said motor-driving circuit to supply the electric power stored in said storage device to said motor to drive said motor and further to enable said motor to produce a torque acting in a second direction, which is opposite to said first direction, and apply the torque to said drive shaft to rotate said drive shaft in said second direction with said torque not being greater than a maximum static friction torque applied by the engine to said output shaft when said output shaft is at a stop.

8. The power output apparatus in accordance with claim 7, further including a residual capacity measuring device that measures residual capacity of electric power stored in said storage device; and said controller sending said signals when a residual capacity measured by said residual capacity device is greater than a predetermined value.

9. A power output apparatus comprising:

an output shaft that receives power from and is rotated by an engine in a first direction;

a drive shaft that transmits power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor; and a controller that sends signals to said first and second motor-driving circuits to cause said drive shaft to rotate in a second direction, which is opposite to said first direction, by controlling said second motor-driving circuit to cause said second motor to regenerate electric power and to produce a first torque acting on said drive shaft in said first direction, and by concurrently controlling said first motor-driving circuit to supply the regenerated electric power to said first motor to drive said first motor and to produce a second torque acting on said drive shaft in said second direction.

10. The power output apparatus in accordance with claim 9, wherein said third rotor is mounted on said second rotor connected with said drive shaft.

11. A power output apparatus comprising:

an output shaft for receiving power from an engine and for being rotated by the engine in a first direction;

a drive shaft that transmits power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor driving circuits to cause said first motor-driving circuit to drive said first motor to make said drive shaft rotate in a second direction, which is opposite to said first direction, and to cause said second motor-driving circuit to supply the electric power stored in said storage device to said second motor and cause said second motor to fix said output shaft and prevent said output shaft from rotating with said first motor-driving circuit supplying the electric power stored in said storage device to said first motor.

12. The power output apparatus in accordance with claim 11, wherein said third rotor is mounted on said first rotor connected with said output shaft.

13. A power output apparatus comprising:

an output shaft for receiving power from an engine and for being rotated by the engine in a first direction;

a drive shaft that transmits power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft, said stator being electromagnetically coupled with said third rotor;

a second motor-driving circuit that exchanges electric currents with said second motor to vary the electromagnetic coupling of said stator with said third rotor; and a controller that sends signals to said first and second motor driving circuits to cause said first motor-driving circuit to drive said first motor to make said drive shaft rotate in a second direction, which is opposite to said first direction, and to cause said second motor-driving circuit to cause said second motor to regenerate electric power and to cause said first motor-driving circuit to supply the regenerated electric power to said first motor.

14. The power output apparatus in accordance with claim 13, wherein said third rotor is mounted on said first rotor connected with said output shaft.

15. A power output apparatus comprising:

an output shaft for receiving power from an engine and for being rotated by the engine in a first direction;

a drive shaft that transmits power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor-driving circuits to cause said first motor-driving circuit to drive said first motor to make said drive shaft rotate in a second direction, which is opposite to said first direction, and to cause said second motor-driving circuit to cause said second motor to regenerate electric power and to cause said first motor-driving circuit to supply the regenerated electric power and the electric power stored in said storage device to said first motor.

16. The power output apparatus in accordance with claim 15, wherein said third rotor is mounted on said first rotor connected with said output shaft.

17. A power output apparatus comprising:

an output shaft for receiving power from an engine and for being rotated by the engine in a first direction;

a drive shaft that transmits power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said output shaft, said stator being electromagnetically coupled with said third rotor;

a second motor-driving circuit that exchanges electric currents with said second motor to vary the electromagnetic coupling of said stator with said third rotor;

a storage device that stores electric power; and a controller that sends signals to said first and second motor-driving circuits to cause said first motor-driving circuit to drive said first motor to make said drive shaft rotate in a second direction, which is opposite to said first direction, and to cause said second motordriving circuit to cause said second motor to regenerate electric power and to cause said first motor-driving circuit to supply the regenerated electric power to said first motor and at least partly to said storage device to be stored.

18. The power output apparatus in accordance with claim 17, wherein said third rotor is mounted on said first rotor connected with said output shaft.

19. A power output apparatus comprising:

an output shaft for receiving power from an engine and for being rotated by said engine in a first direction;

a drive shaft, for transmitting power to a load;

a first motor comprising a first rotor connected with said output shaft and a second rotor connected with said drive shaft, said second rotor being coaxial to and rotatable relative to said first rotor, said first and second rotors being electromagnetically coupled with each other to transmit power between said output shaft and said drive shaft via the electromagnetic coupling of said first and second rotors;

a first motor-driving circuit that exchanges electric currents with said first motor to vary the electromagnetic coupling of said first rotor with said second rotor;

a second motor comprising a stator and a third rotor connected with said drive shaft, said stator being electromagnetically coupled with said third rotor;

a second motor-driving circuit that exchanges electric currents with said second motor to vary the electromagnetic coupling of said stator with said third rotor; and a controller that sends signals to said first motor-driving circuit and said second motor-driving circuit to control said first motor-driving circuit to enable said first motor to regenerate electric power, and to control said second motor-driving circuit to supply the regenerated electric power to said second motor to drive said second motor to make said drive shaft rotate in a second direction, which is opposite to said first direction.

20. The power output apparatus in accordance with claim 19, further including an engine control device that increases revolving speed of said output shaft to enhance the electric power regenerated by said first motor.

* * * * *